(12) United States Patent
Fox

(10) Patent No.: US 8,730,098 B1
(45) Date of Patent: May 20, 2014

(54) METHOD FOR RADAR DETECTION OF PERSONS WEARING WIRES

(75) Inventor: William P. Fox, Pebble Beach, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 316 days.

(21) Appl. No.: 13/344,451

(22) Filed: Jan. 5, 2012

Related U.S. Application Data

(60) Provisional application No. 61/429,864, filed on Jan. 5, 2011.

(51) Int. Cl.
- *G01S 13/04* (2006.01)
- *G01S 13/88* (2006.01)
- *G01S 13/00* (2006.01)

(52) U.S. Cl.
USPC .............. 342/188; 342/22; 342/27; 342/73; 342/89; 342/90; 342/91; 342/175; 342/192; 342/195

(58) Field of Classification Search
CPC ........... G01S 7/02; G01S 7/024; G01S 7/025; G01S 13/02; G01S 13/04; G01S 13/88; G01S 13/887
USPC ........ 324/76.11, 95; 343/700 R, 703; 342/21, 342/22, 27, 28, 82, 89–93, 175, 188, 189, 342/192–197, 350, 351, 361–366, 73
See application file for complete search history.

(56) References Cited

U.S. PATENT DOCUMENTS

| | | | | |
|---|---|---|---|---|
| 3,775,765 A * | 11/1973 | Di Piazza et al. | ............... | 342/22 |
| 3,890,571 A * | 6/1975 | Beyer | ............... | 324/95 |
| 4,035,797 A * | 7/1977 | Nagy | ............... | 342/188 |
| 4,107,678 A * | 8/1978 | Powell | ............... | 342/188 |
| 4,231,037 A * | 10/1980 | Long | ............... | 342/188 |
| 4,323,898 A * | 4/1982 | Barnes et al. | ............... | 342/90 |
| 4,556,888 A * | 12/1985 | McNaul | ............... | 342/362 |
| 5,235,340 A * | 8/1993 | Shea | ............... | 342/188 |
| 5,264,856 A * | 11/1993 | Thurlow | ............... | 342/188 |
| 5,334,981 A * | 8/1994 | Smith et al. | ............... | 342/27 |
| 5,420,590 A * | 5/1995 | Shea | ............... | 342/188 |
| 5,420,591 A * | 5/1995 | Annee et al. | ............... | 342/188 |
| 6,278,409 B1 * | 8/2001 | Zuta | ............... | 342/188 |
| 6,608,587 B1 * | 8/2003 | Sparrow et al. | ............... | 342/188 |
| 6,762,713 B1 * | 7/2004 | McMillan et al. | ............... | 342/188 |
| 6,911,937 B1 * | 6/2005 | Sparrow et al. | ............... | 342/188 |
| 8,193,966 B2 * | 6/2012 | Holly et al. | ............... | 342/22 |

\* cited by examiner

*Primary Examiner* — Bernarr Gregory
(74) *Attorney, Agent, or Firm* — Naval Postgraduate School; Lisa A. Norris

(57) ABSTRACT

Methods are described for radar detection of persons wearing wires using radar spectra data including the vertical polarization (VV) radar cross section and the horizontal polarization (HH) radar cross section for a person. In one embodiment, the ratio of the vertical polarization (VV) radar cross section to the horizontal polarization (HH) radar cross section for a person is compared to a detection threshold to determine whether the person is wearing wires. In another embodiment, the absolute difference of the vertical polarization (VV) radar cross section and the horizontal polarization (HH) radar cross section for a person is compared to a detection threshold to determine whether the person is wearing wires. To reduce false positives, other additional indicators, such as speed of movement, and or visual features of the person, can be used to further narrow a person suspected of wearing wires.

4 Claims, 19 Drawing Sheets

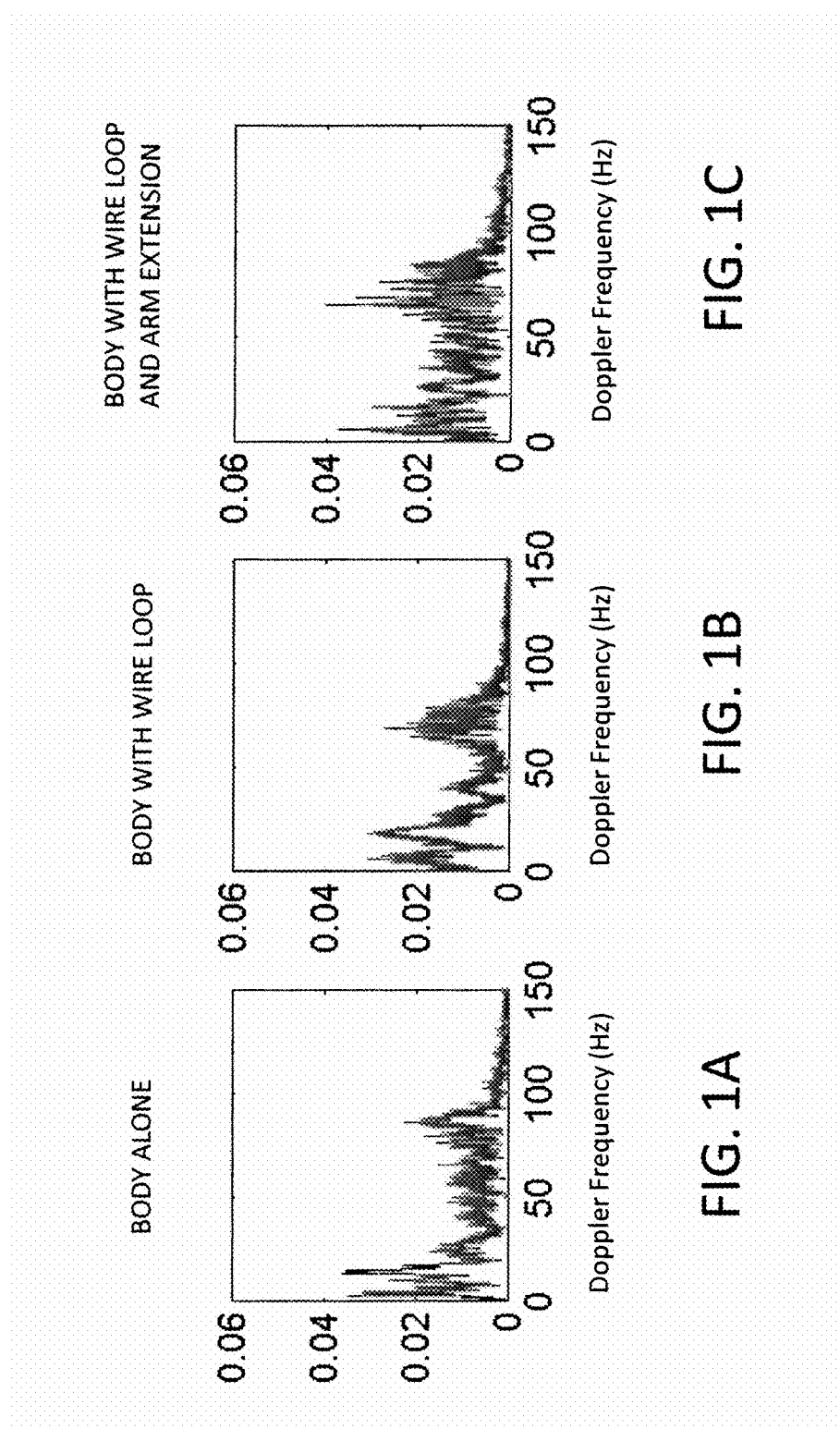

METHOD FOR RADAR DETECTION OF PERSONS WEARING WIRES

CROSS-REFERENCE TO RELATED APPLICATIONS

This application claims the benefit of U.S. Provisional Application No. 61/429,864, filed Jan. 5, 2011, which is hereby incorporated in its entirety by reference.

BACKGROUND OF THE INVENTION

1. Field of the Invention

The present invention relates generally to radar detection of persons wearing wires.

2. Description of the Related Art

Over the course of the past 25 years, suicide attacks have emerged as a method used on a large scale by terrorist organizations to inflict lethal damage and create fear and chaos. The willingness of an individual to sacrifice their own life in the course of an attack is a significant force multiplier when employed against a conventional security force. As the explosive devices worn or carried by suicide bombers are usually hidden, it is difficult to detect suicide bombers prior to detonation so that preventative measures can be taken.

SUMMARY OF THE INVENTION

In accordance with one embodiment, a method for detecting persons wearing wires includes: determining the vertical polarization radar cross section (VV RCS) for a subject, such as a person; determining the horizontal polarization radar cross section (HH RCS) for the subject; determining the ratio of the vertical polarization radar cross section to the horizontal polarization radar cross section (VV RCS/HH RCS or HH RCS/VV RCS); comparing the ratio to a specified detection threshold; when said ratio is above the detection threshold, determining the subject is wearing wires; and when the ratio is below said detection threshold, determining the subject is not wearing wires.

In accordance with another embodiment, a method for detecting persons wearing wires includes: determining the vertical polarization radar cross section (VV RCS) for a subject, such as a person; determining the horizontal polarization radar cross section (HH RCS) for the subject; determining the absolute difference of the vertical polarization radar cross section and the horizontal polarization radar cross section (|VV RCS|−|HH RCS|); comparing the absolute difference to a specified detection threshold; when the absolute difference is above said detection threshold, determining the subject is wearing wires; and when the absolute difference is below the detection threshold, determining the subject is not wearing wires.

In some embodiments, additional indicators such as speed of movement or visual indicators can be added to further narrow a person suspected of wearing wires. In one embodiment, a method for simulating the detection of persons wearing wires is described.

Embodiments in accordance with the invention are best understood by reference to the following detailed description when read in conjunction with the accompanying drawings.

BRIEF DESCRIPTION OF THE DRAWINGS

FIG. 1A shows the Doppler spectra of a body with no wires, i.e., body alone.

FIG. 1B shows the Doppler spectra of a body with a wire loop attached.

FIG. 1C shows the Doppler spectra of a body with a wire loop and arm extension.

Figure 2B:
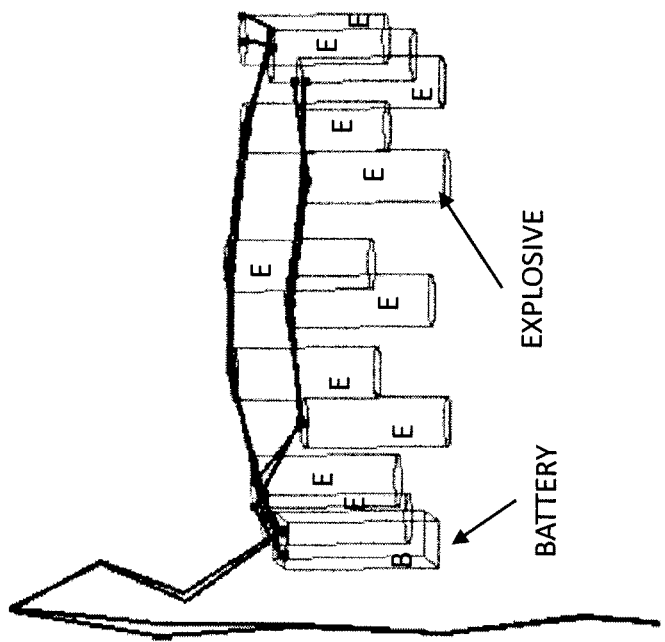
FIG. 2B illustrates a wiring configuration for a vest 2 having a similar wiring configuration to vest 1 of FIG. 2A and further includes a pair of wires for running under clothing simulating connection to a switch in a person's hand.

Embodiments in accordance with the invention are further described herein with reference to the drawings.

DETAILED DESCRIPTION OF THE INVENTION

Embodiments in accordance with the invention provide a method for detecting targets, such as people or animals, wearing wires based on radar cross sectional data and or polarization characteristics related to the wires being on the target. Embodiments in accordance with the invention aid in separating out targets that are more likely to have wires on their person, such as suicide bombers, and hence, represent threats. Embodiments in accordance with the invention can be employed in airports, market places, military check points, other transportation centers, as well as anywhere a suicide bomber may present themselves, as an initial step in preventing suicide bombings.

Radar operates by generating radio waves, transmitting them through an antenna toward a target and then observing the radio waves that are scattered by targets and returned as echoes to the radar's receiving antenna. As is well known to those of skill in the art, the movement of a person toward a radar causes a Doppler shift to the echo, making the frequency of the echo slightly higher and the wavelength of the echo slightly shorter than the waves transmitted from the radar. The radar signal power echoed from a compact target is given by the radar range equation:

$$P_r(r)=(P_tG_tA_rRCSL_s)/(4\pi r^2)^2=(P_tG_tG_r\lambda^2RCSL_s)/((4\pi)^3r^4) \quad (1)$$

where $P_r$=power received in Watts, $P_t$=power transmitted in Watts, $G_t$=transmit antenna gain, $A_r$=receiver antenna area in m$^2$, RCS=radar cross section in m$^2$, $L_s$=system loss factor, r=range to target in m. The right hand version of the equation uses the relation that $G_r$=receiver antenna gain=$4\pi A_r/\lambda^2$ where $\lambda$ is the wavelength in meters.

As is also well known to those of skill in the art, radars can measure a variety of characteristics of the target, principally range via echo time delay, speed via Doppler shift and radar cross section via echo strength and characteristics. Due to the very close range of the target, tens of meters, determining range using pulses requires some care in the radar design as the round trip travel time to the target and back is only 67 nanoseconds (for 10 m range). Pulse-Doppler radar can determine both speed and range.

Radars are capable instruments that operate at day or night and in most weather conditions. Basic radar measurements produce (a) location of a target in range and direction, measured in m and degrees, (b) target speed along the radar ray path in m/s, (c) radar cross-section (characteristics of radar echoes that derive from target characteristics), and (d) fluctuations in the three measurements above.

Radar waves are typically polarized. The more common polarizations are VV, vertical polarization on transmit and vertical polarization on receive, and HH, horizontal polarization on transmit and horizontal polarization on receive. Vertical polarization means that the radar wave has its electric field in the plane of incidence, typically perpendicular to the Earth's surface for near surface geometry. Thus, VV implies that the transmitter launches V polarization waves and the receiver is most sensitive to V polarization waves in the radar echoes. H polarization waves have their electric fields perpendicular to V polarized waves and are typically parallel to the Earth's surface. HH implies that H polarized waves are transmitted and H polarization waves are received.

Important obstacles in interpreting radar echoes from subjects are echoes from stationary objects in the field of the view of the radar. The echoes from these stationary objects are called clutter. As is well known to those of skill in the art, an important technique in removing clutter is called moving target discrimination or Doppler filtering.

Radar echoes are shifted slightly in frequency by $$\Delta f=V_r/(\lambda/2), \quad (2)$$

when they are returned from moving targets, with speed $V_r$ along the radar line of sight and radar wavelength ($\lambda$) in meters. Even a very simple radar can measure this frequency shift very precisely. Moving subjects, such as walking subjects, have an easily detectable Doppler shift which separates them from clutter as further described with reference to FIGS. 1A, 1B, and 1C.

FIGS. 1A, 1B, and 1C illustrate three Doppler spectra collected in laboratory experiments (with a $\lambda$=0.03 m wavelength radar) in which a person walks toward a 10.5 GHz CW Doppler radar. FIG. 1A shows the Doppler spectra of a body with no wires, i.e., body alone. FIG. 1B shows the Doppler spectra of a body with a wire loop attached. FIG. 1C shows the Doppler spectra of a body with a wire loop and arm extension. These spectra show a distinct peak at Doppler frequencies of about 70 to 90 Hz. Using equation 1 above it can be seen that these peaks correspond to walking speeds of 1 to 1.3 m/s. As a measure of radar cross section, a metric, such as the height of the Doppler spectrum peak, associated with walking speed, or the area under the Doppler peak, can be utilized thus avoiding stationary background clutter echoes with Doppler shifts near zero hertz (Hz).

One typical feature of body-worn improvised explosive devices (IEDs) typically worn by suicide bombers, is that they often tend to have outer metallic shells, resembling pipes or tubes. The metal casing increases the explosive's damage potential by projecting high-velocity shrapnel, but it also provides a detection characteristic. Circular metal cylinders have strong radar cross sections, scattering incident RF plane waves with characteristic patterns.

In one embodiment, estimations of radar cross section (RCS) are made by simulating an illuminating plane wave, incident upon the simulated vest wiring configurations. The simulated electric field is uniform with an intensity of 1 V m$^{-1}$. The simulated backscatter is computed for a field point at a distance of 50 m from the simulation grid origin. The RCS is then determined using $$\sigma = 4\pi r^2 \frac{|E_s|^2}{|E_i|^2}, \quad (3)$$

where, r is the distance between the scattering object the observation point and $E_i$ and $E_s$ are the incident and scattered electric fields respectively. The scattered field is calculated using Numerical Electromagnetic Code (NEC) as a function of the azimuth angle $\phi_s$, the polar angle $\theta_s$ and the distance from the origin, r, held constant at 50 m. Further discussion can be found in the text *A First Course in Mathematical Modeling*, 4$^{th}$ ed. by William P. Fox et al. (Cengage Publishing, 2009).

Figure 2A:
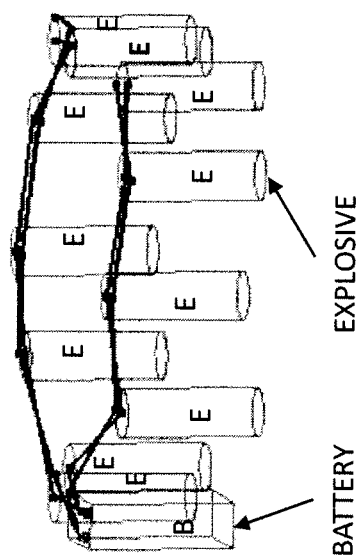
FIG. 2A illustrates a wiring configuration for a vest 1 which contains only wires connected to igniters for explosives and a battery.

In one embodiment, two simple wire configurations for simulating explosive vests are investigated and include those shown in FIGS. 2A and 2B. FIG. 2A illustrates a wiring configuration for a vest 1 which contains only wires connected to igniters for explosives (E) and a battery (B). FIG. 2B illustrates a wiring configuration for a vest 2 having a similar wiring configuration to vest 1 and further includes a pair of wires for running under clothing simulating connection to a switch in a person's hand. The illustrated viewing angles of vest 1 and vest 2 are defined relative to the x axis (horizontal in the plane of the page). In FIGS. 2A and 2B, vests 1 and 2 are viewed from between 270 and 360 degrees azimuth, polar angle less than 90 degrees. In one embodiment, the radar cross sections (RCS) for the vest configurations is determined for two frequency ranges, a first frequency range, centered on 10 GHz, and a second frequency range, centered on 1 GHz. Data collection of the radar cross sections is made using the method of moments software, Numerical Electromagnetic Code (NEC), NEC 2 (www.nec2.org). The data collection of the radar cross sections of vest 1 and vest 2 are further described herein with reference to FIGS. 3A and 3B, 4A, and 4B, and FIG. 5.

Figures 3A, 3B:
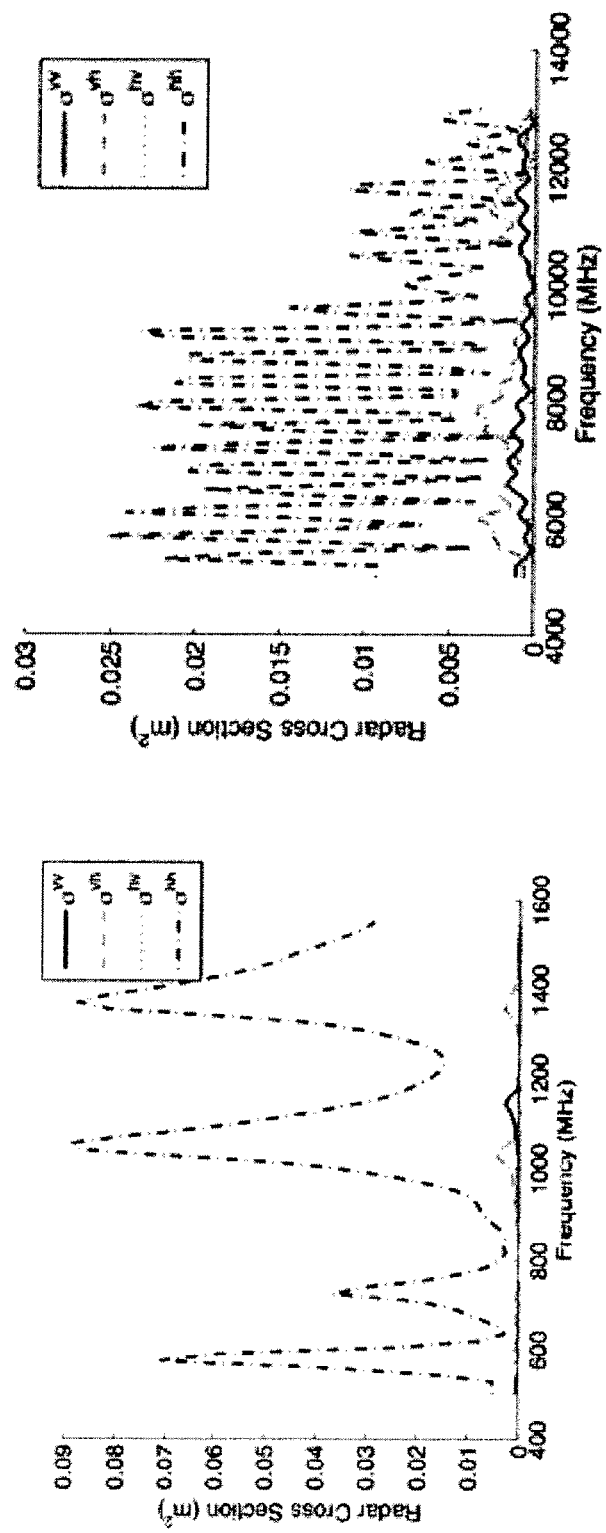
FIG. 3A illustrates a radar cross section of vest 1 from 0.5 to 1.6 GHz.
FIG. 3B illustrates a radar cross section of vest 1 from 5 to 13 GHz.

FIGS. 3A and 3B illustrate radar cross sections of vest 1 of FIG. 2A for both low and high microwave frequencies. FIG. 3A illustrates a radar cross section of vest 1 from 0.5 to 1.6 GHz. FIG. 3B illustrates a radar cross section of vest 1 from 5 to 13 GHz. In each of FIG. 3A and FIG. 3B, the radar cross section is shown for all four permutations of transmit and receive polarization (VV, VH, HV and HH). These RCS estimates are made using the NEC method of moments' technique for a 0 degree azimuth (looking into FIG. 2A, perpendicular to the page).

In FIGS. 3A and 3B the HH polarization is consistently stronger as the wires in vest 1 (FIG. 2A) are consistently more nearly horizontal (H) than vertical (V). Thus, the incident electric field of the radar signal is parallel to the wires for H polarization and excites stronger currents in the wires than does a radar signal with V polarization that has the electric field perpendicular to the wires. The peaks and valleys that occur as frequency changes are due to constructive and destructive interference between the radar echoes from different portions of the wire structure. This feature is common to nearly all complex conducting structures, such as airplanes.

Figure 4B:
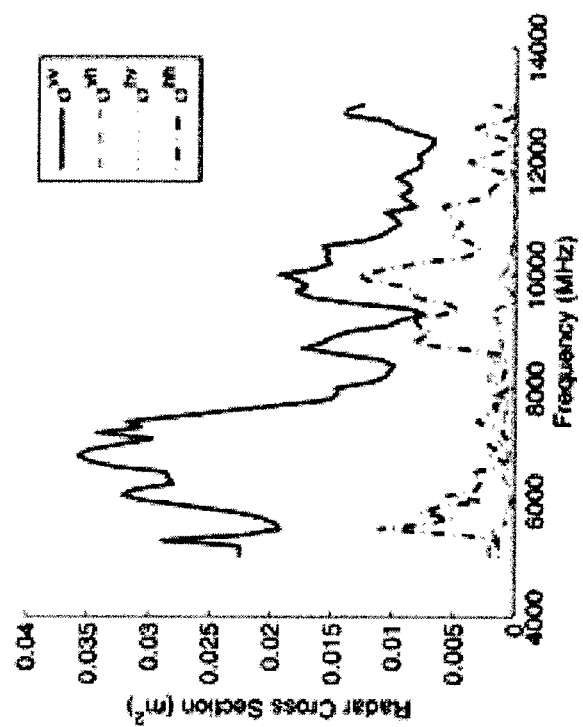
FIG. 4B illustrates a radar cross section of vest 2 from 5 to 13 GHz.
Figure 4A:
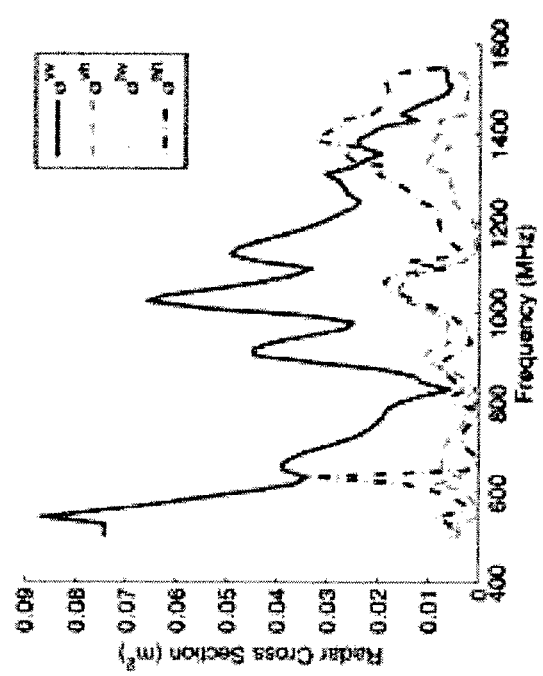
FIG. 4A illustrates a radar cross section of vest 2 from 0.5 to 1.6 GHz.

FIGS. 4A and 4B illustrate radar cross sections of vest 2 of FIG. 2B for both low and high microwave frequencies. FIG. 4A illustrates a radar cross section of vest 2 from 0.5 to 1.6 GHz. FIG. 4B illustrates a radar cross section of vest 2 from 5 to 13 GHz. In each of FIG. 4A and FIG. 4B, the radar cross section is shown for all four permutations of transmit and receive polarization (VV, VH, HV and HH). These RCS estimates are made using the NEC method of moments' technique for a 0 degree azimuth (looking into FIG. 2B, perpendicular to the page).

In contrast to FIGS. 3A and 3B, as shown in FIGS. 4A and 4B, the VV polarization is consistently stronger as the wires in vest 2 (FIG. 2B) have some nearly horizontal (H) and some nearly vertical (V) elements. Thus, the incident electric field of the radar signal can excite strong currents in some of the wires regardless of whether the incident polarization is V or H. Again, the peaks and valleys that occur as frequency changes are due to constructive and destructive interference between the radar echoes from different portions of the wire structure. Since there are both horizontal and vertical structures in vest 2 (FIG. 2B), VV and HH radar cross-sections are more nearly equal in magnitude.

Figure 5:
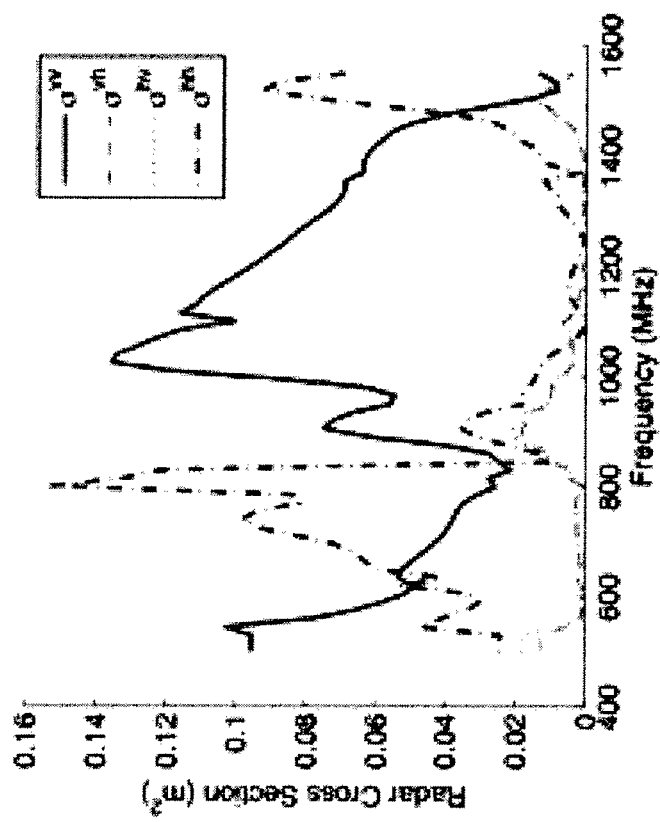
FIG. 5 illustrates a radar cross section of vest 2 of FIG. 2B from 0.5 to 1.6 GHz viewed at a 90° azimuth angle.

FIG. 5 illustrates a radar cross section of vest 2 (FIG. 2B) from 0.5 to 1.6 GHz viewed at a 90° azimuth angle. The radar cross section is shown for all four permutations of transmit and receive polarization (VV, VH, HV and HH). The RCS estimates are made using the NEC method of moments' technique and are for a 90-degree azimuth (looking from the edge of FIG. 2B, parallel to the page). As shown, either VV or HH polarization can dominate depending on the frequency. This phenomenon is due to interference effects from the somewhat complex wire structure that contains both vertical and horizontal elements. Note that, regardless of the stronger polarization, one polarization or the other tends to dominate, i.e. they are seldom of equal strength.

In one embodiment, a superposition approach is utilized in considering the suitability of radar cross section measurements as metrics for detecting people with wires present on their bodies in contrast to those without wires on their bodies. In one embodiment, the radar cross section of the body alone is added to the cross-section of the wires. Considering the results of FIGS. 3A, 3B, 4A, 4B and 5, several salient features are observable. If only radar cross-section magnitude is utilized as a signature, the RCS of the wires alone is typically smaller than the RCS of the human body alone except for frequencies near 1 GHz. This indicates that aside from the frequencies near 1 GHz, a different metric is needed for a useful radar metric to separate suspects with wires on their bodies from innocent subjects without wires. In considering FIGS. 3A, 3B, 4A, 4B, and 5 it can be concluded that the polarization ratio is significantly different from the body alone.

For nearly all frequencies either VV or HH cross-sections dominate—the VV and HH cross sections are seldom nearly equal as confirmed in the experimental measurements. Thus, the VV and HH differences are examined. In addition to numerical electromagnetic calculations, a small number of experiments using a simple CW Doppler radar are performed. These experiments confirm the numerical calculations and added observational data to get a practical view of the problem. Analysis indicates that measurements in the 0.5 to 2.6 GHz range are useful. In one embodiment, a GunnPlexer CW Doppler radar apparatus is used to collect experimental measurements.

Individuals with and without wires are utilized. The wires are used both with and without loops, corresponding to the two configurations shown previously in FIGS. 2A and 2B. Three categories of experiments are conducted using the 10.525 GHz GunnPlexer CW Doppler radar. Experiment 1 is a pendulum experiment with vertical wires. In Experiment 1, the experimental apparatus is characterized and calibrated in terms of a wire of known radar cross-section. Experiment 2 is a body experiment with subjects walking toward the radar. In Experiment 2, a person starts from a marker≈5 m from the GunnPlexer Doppler radar and walks to a marker about 2 m from the radar. The person is observed without wires and with several different wire configurations on their bodies. Experiment 3 is a body experiment with subjects at approximately a constant range, swaying back and forth, toward and away from the GunnPlexer Doppler radar, in order to generate a Doppler signal. These experiments give a more consistent movement and are used in addition to those experiments above to measure the radar cross-section of a person with and without wires on their body.

Figure 6:
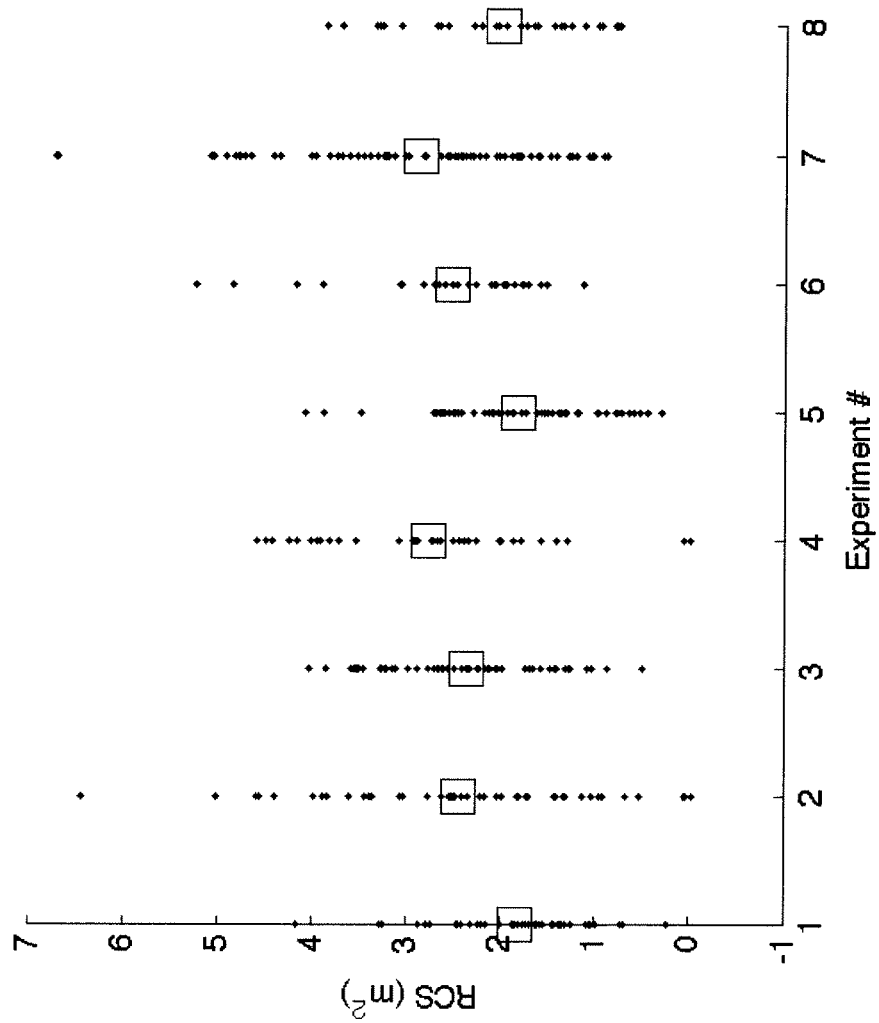
FIG. 6 illustrates scatter plots of eight experiments.

Eight different cases are used as experimental runs and data collected for each case. The scatter plots of the eight experiments are shown in FIG. 6. The scatter plot of the data, along with the mean values, are plotted for a sequence of oscillating body experiments conducted along the lines of Experiment 3 for:

1. No metal on person, VV polarization;
2. No metal on person, VV polarization, repeated;
3. No metal on person, HH polarization;
4. Wire loop around waist, VV polarization;
5. Wire loop around waist, HH polarization;
6. Wire loop+wire under shirt sleeve going from waist to hand, VV polarization;
7. Wire loop+wire under shirt sleeve going from waist to hand, VV polarization, repeated; and
8. Wire loop+wire under shirt sleeve going from waist to hand, HH polarization.

A measure of uncertainty in the mean RCS estimate is obtained from the standard deviations of the values in each experimental column divided by the square root of the number of measurements. These data are summarized in Table 1. The advantage of these data relative to the earlier body RCS data (from numerical calculations), apart from an expected reduction in uncertainty, is the ability to estimate the experimental uncertainty from the multiple independent measurements obtained from each time series.

TABLE 1

Mean RCS Measurements of oscillating bodies

| No. | Subject | Description | Pol. | RCS $m^2$ | $\delta_{RCS}$ $m^2$ |
|---|---|---|---|---|---|
| 1 | 1 | No metal | VV | 1.84 | 0.12 |
| 2 | 2 | No metal | VV | 2.44 | 0.19 |
| 3 | 2 | No metal | HH | 2.37 | 0.11 |
| 4 | 2 | Wire loop around Waist | VV | 2.78 | 0.19 |
| 5 | 2 | Wire loop around waist | HH | 1.82 | 0.11 |
| 6 | 1 | Wire loop + wire in shirt sleeve | VV | 2.53 | 0.19 |
| 7 | 2 | Wire loop + wire in shirt sleeve | VV | 2.87 | 0.16 |
| 8 | 2 | Wire loop + wire in shirt sleeve | HH | 2.00 | 0.17 |

The polarization ratio is computed for these data as well and the results summarized in Table 2. The polarization ratio was computed from the mean RCS for each experiment where matched VV and HH polarization data were available. The uncertainty in the polarization ratios is derived from the estimated uncertainty in the mean RCS values used. It is seen from the values in the table that differences in the polarization ratio between the experiments with metal on the person and no metal on the person are greater than the combined uncertainties.

TABLE 2

Polarization Ratio

| No. | Description | RCS VV $M^2$ | RCS HH $m^2$ | Ratio | $\delta$ |
|---|---|---|---|---|---|
| 2 & 3 | No metal | 2.44 | 2.37 | 1.03 | .12 |
| 4 & 5 | Loop around waist | 2.78 | 1.80 | 1.52 | .15 |
| 7 & 8 | Loop + wire in sleeve | 2.87 | 2.00 | 1.43 | .11 |

The data corresponding to subjects approaching the radar at a walking pace is examined in terms of the spectral characteristics of the Doppler signals. Three cases are examined—metal on person, wire loop around waist and wire loop as well as wire from waist to hand going inside the shirt sleeve—using a 10.525 GHz GunnPlexer Doppler Radar. Example results are consistent with FIGS. 4A, 4B, and 4C.

An initial threshold is set to detect and measure the properties of a target (human subject) with a radar cross section of 0.01 m² at a distance of 50 m with a signal to noise ratio of about 15 dB as well as obtaining Doppler shift (and spectra) information regarding the target. A list of radar requirements is set as follows:

Detect a RCS=0.01 m² target at 50 m with a signal to noise ratio SNR=15 dB

Use a radar frequency in the 0.5 to 15 GHz range to maximize the detection metrics Measure the Doppler spectrum of a person moving about 1 m/s to an accuracy of 0.1 m/s Locate a moving target to within a specified accuracy Radar design should be easily deployable from a small vehicle, e.g. HumVee.

To determine the radar power required to make a suitable measurement of a time series of echoes sufficient to measure the required Doppler shift, as this is a pulse-Doppler radar, the starting point for a candidate radar design is the radar range equation (1). The equation is rearranged to solve for the required transmit power $P_t$ and include a factor (n $L_n$) that accounts for integration over a time series of pulses while a subject is within a range resolution cell and substitute $P_r$=SNR*(k $T_o$ F Bw), where (k $T_o$ F Bw) is the noise in the signal to noise ratio (SNR) and $P_r$ is the received signal power:

$$P_t(r) = [SNR(kT_oFBw)(4\pi)^3 r^4]/[nL_n G_t G_r \lambda^2 RCSL_s] \quad (4)$$

where k is Boltzmann's constant, $T_o$=reference temperature (290 K), F is noise figure of the receiver and Bw is the bandwidth of the radar, n is the number of pulses that hit the target in the coherent integration time, i.e. while it is in a range resolution cell, $L_n$ is the loss in the coherent integration processing, $G_t$ and $G_r$ are the gains of the transmit and receive antennas and RCS is the radar cross section of the target.

Figure 7:
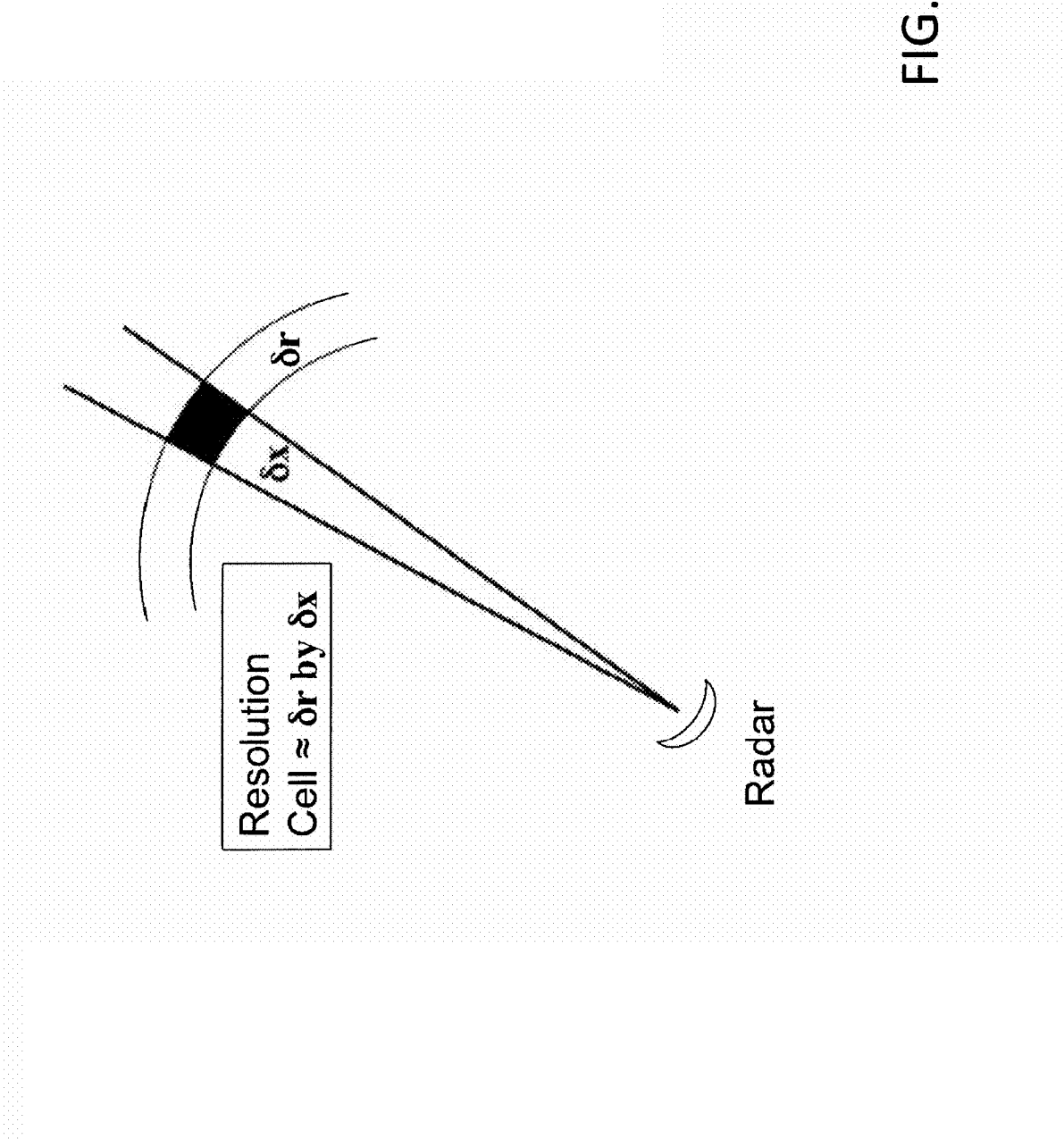
FIG. 7 illustrates a resolution cell in range and azimuth coordinates.

The location of a target is helpful in isolating suspects with wires on their bodies. As is well known to those of skill in the art, a radar can typically locate a target in a resolution cell in range and azimuth coordinates as shown in FIG. 7. The radar bandwidth defines the range resolution cell by $\delta r = c/2Bw$, where c is the speed of light. The azimuthal (angular) resolution cell is defined by $\delta\theta \approx \lambda/D$, where D is the antenna width or diameter. The impact of location can be illustrated using examples. For example, consider a range of 50 m, two radar frequencies 1 and 10 GHz and a half meter antenna size, and a typical radar bandwidth of 10% of the radar frequency.

TABLE 4

Target Location Capabilities of Example Radars

| Radar Frequency, f in GHz | Range Location Resolution, $\delta r$ in m | Azimuth Location Resolution, $\delta x$ in m |
|---|---|---|
| 1 | 1.5 | 30 |
| 10 | 0.15 | 3 |

Radar frequency is an important parameter as it is a focus of important system tradeoffs. As illustrated in Table 4, higher frequencies yield significantly better location resolution, especially in lateral location. At 10 GHz location resolution is excellent along the range direction and adequate along the azimuth direction. At 1 GHz location resolution is adequate along the range direction, but only marginally useful along the azimuth direction. Thus, from the point of view of location accuracy, the higher frequency is preferable. However, from the point of view of detection metrics, the lower frequency is likely to be better. The antenna for the radar is likely to serve for both transmit and receive. Probably the better choice is a horn antenna that can cover a 2 to 1 or 3 to 1 range of frequencies.

The speed measurement requirement of 0.1 m/s implies a Doppler frequency resolution requirement of 0.67 Hz (per equation 2) for a 1 GHz radar and 6.7 Hz for a 10 GHz radar. The 1 GHz radar should observe a target for an integration time of about 1.5 s and 0.15 s for a 10 GHz radar. Thus, the target should remain in a single resolution cell for at least these time periods. A walking person typically walks at no more than 2 m/s so this requirement can be met with the values in Table 4.

A fundamental limitation on the radar is that the pulse length cannot exceed the time needed to travel to the target and back. If targets need to be observed as close as 10 m, the maximum pulse length is about 67 ns or a minimum bandwidth of about 15 MHz. Knowing that radar bandwidth $Bw \approx c/(2\delta r)$ and consulting Table 4, it can be seen that bandwidths of about 100 MHz (1 GHz radar) and 1 GHz (10 GHz radar), 10% of the radar frequency, are quite adequate. Thus the minimum bandwidth is easily achieved by meeting the target location goals of Table 4. The very close proximity of targets, tens of meters, means that short pulse lengths should be used to prevent pulses from overlapping. Since pulse compression (chirp radar) is difficult technically for short pulses, it would be of limited advantage in this application.

To have a good signal to noise ratio, a SNR=15 dB=a ratio of 32 is specified. Considering the background thermal noise, the required signal power from a radar pulse series, is set as $P_r$=SNR (k $T_o$ F Bw). The noise (k $T_o$ F Bw) is defined by Boltzmann's constant=1.38 $10^{-23}$ J/K, $T_o$=290 K and the factors F and Bw. The bandwidth Bw is defined by Table 4 above and the noise figure, F, achievable at 1 and 10 GHz is ≈2 or less using MESFET or HEMPFET devices.

The pulse repetition frequency (PRF) is limited by a desire to have a lot of pulses on the target to achieve a higher SNR and not wanting pulses to overlap. A PRF=3000 Hz is selected as this value is easy to achieve technologically and does not allow overlap for targets out to 50 km. Since 50 km is over the horizon and echoes from targets further away would be very weak, 3000 Hz seems a reasonable choice—it could probably be significantly higher. In 1.5 s this means that the number of pulses on a target within a coherent integration time is n=4,500. It can be anticipated that the coherent integration will not be 100% efficient and so set $L_n$=0.8 (a typical number). Setting system losses $L_s$=0.5 is a typical rule of thumb.

All the parameters in equation (4) are specified and can estimate the peak transmit power required for r=50 m as shown in Table 5 below.

TABLE 5

| Frequency, GHz | Bandwidth, GHz | Coherent Integration Time, s | Peak Transmit Power Required, W | Average Transmit Power Required, W |
|---|---|---|---|---|
| 1 | 0.1 | 1.5 | 0.005 | $1.5 \times 10^{-8}$ |
| 10 | 1 | 0.15 | 50 | $1.5 \times 10^{-3}$ |

A solid-state transmitter at 1 to 10 GHz easily achieves these peak and average power levels. It can be appreciated that the average power power $P_{avg}$=$P_t$PRF τ ≈ ($P_t$PRF)/Bw, where τ is the pulse length, is very small. Thus, transmitter power consumption will not be a power consumption concern overall. Conservative estimates of total power, weight and volume should be of the order of 10 s of Watts≈10-20 lbs (antenna is a major factor and an antenna support has been excluded) and about a 1.5 ft cube or smaller, depending on the antenna.

Figure 8:
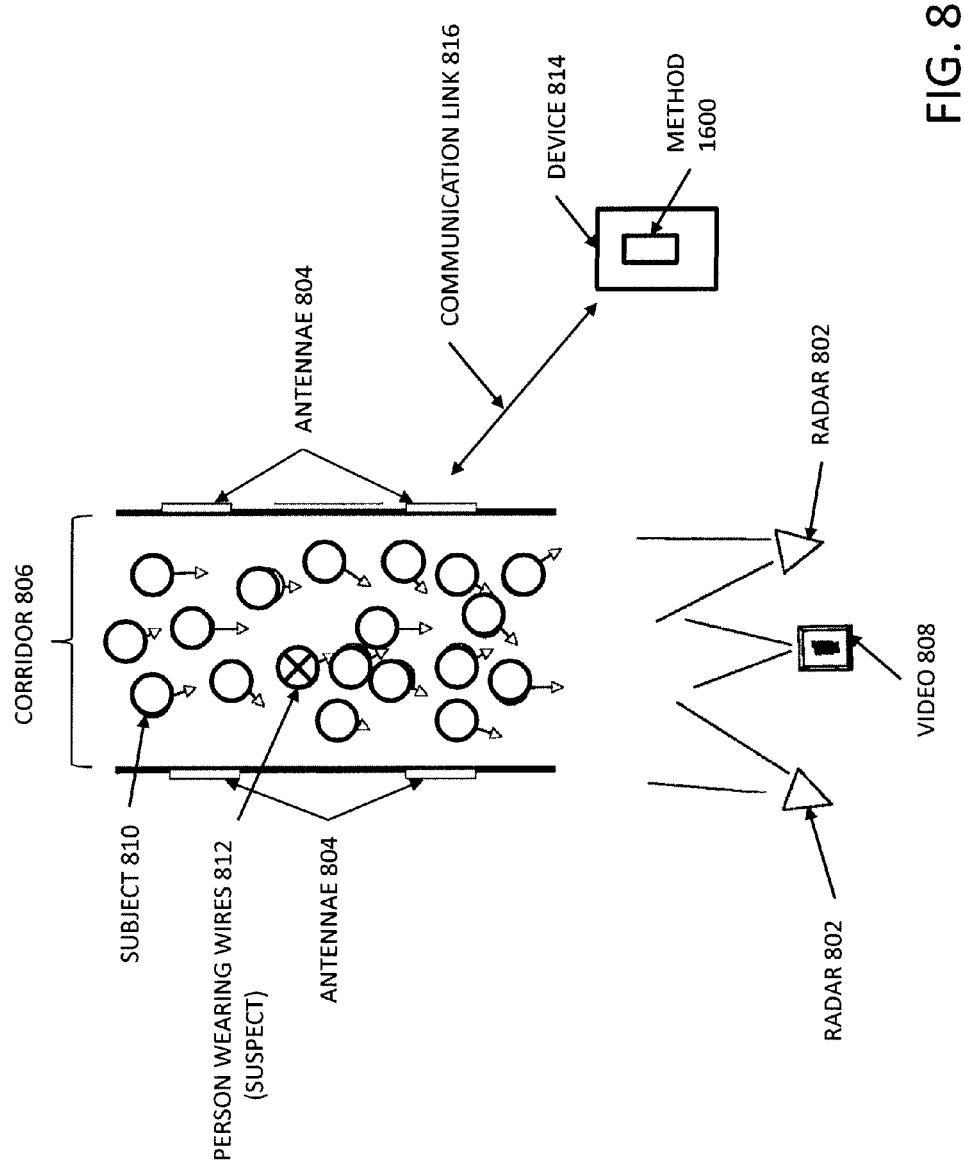
FIG. 8 illustrates an overhead view of a system for detecting persons wearing wires in accordance with one embodiment.

FIG. 8 illustrates an overhead view of a detection system 800 for detecting persons wearing wires in accordance with one embodiment. As illustrated in FIG. 8, detection system 800 includes one or more radar 802 and one or more antennae 804 together with associated electronics through which subjects 810, such as people and or animals, transit through a detection corridor 806. In one embodiment radar 802 is a CW Doppler (GunnPlexer) type radar.

In one embodiment, radar 802 and antenna(e) 804 are positioned on an elevated mast above ground level, for example, 10 or more feet, to prevent having to "look" thorough a group of subjects 810. In one embodiment, the bulk of the associated electronics, aside from prime power that may be supplied from a vehicle or main supply, would be near the ground, connected to antenna(e) 804 by a cable (not shown) and linked by wireless to a display device 814, such as a handheld display device for a monitor, such as a soldier or policeman. While a CW Doppler (GunnPlexer) type radar could be used in the fashion of a radar speed gun, the pulse Doppler radar discussed above would provide more robust operation in terms of higher probability of detection and lower false alarm rate. One or more video cameras 808 can also be included to assist in further determining a subject 810 suspected of wearing wires.

In one embodiment, subjects 810 would move through corridor 806 while radar 802 are active. Radar 802 would produce and send radar waves toward subjects 810 in corridor 806. At least a portion of the sent radar waves would be reflected off moving subjects 810 and the reflected wave signals received by antennae 804. Antennae 804 would communicate the received signals to receiving device 814, such as the handheld display. Receiving device 814 would process the signals in accordance with an embodiment of the method described herein and output a determination of a suspected person wearing wires, e.g., a suspect 812, in subjects 810, if any. The information can then be acted upon if so desired.

From the numerical modeling and experiments above, several basic metrics are determined as potential modeling metrics for detection of suspects, herein defined as people with wires on their bodies, in a group of subjects herein defined as innocent people without wires. These two metrics are: the magnitude of the radar cross section (either VV or HH), and the polarization ratio herein defined as the ratio between these radar cross sections, i.e., $RCS_{VV}/RCS_{HH}$.

Considering FIGS. 3A/3B, 4A, 4B, and 5 the RCS for both VV and HH of typical wire configurations is in the range 0.01 to 0.1 m². Thus straightforward use of the RCS magnitude as a metric is not feasible, except possibly in the frequency range near 1 GHz. However, the use of polarization ratio as a metric does appear feasible.

Figure 9:
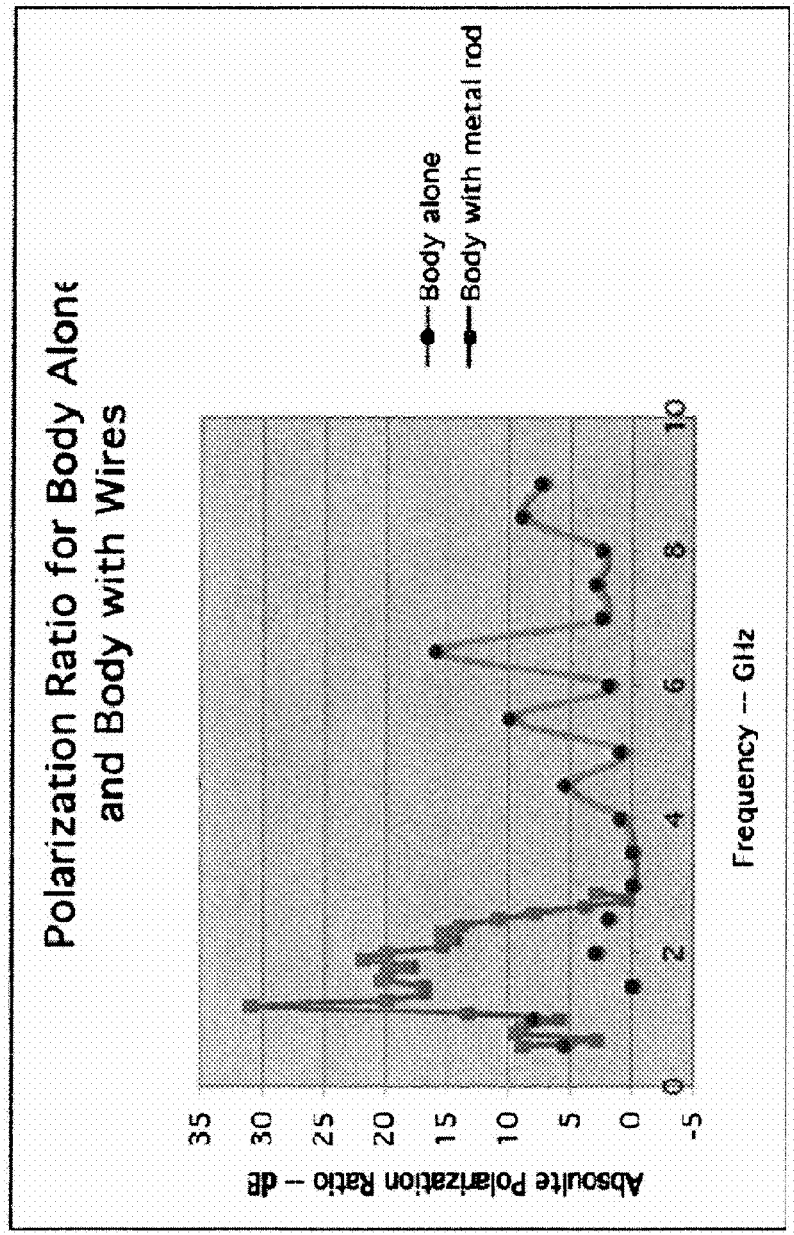
FIG. 9 illustrates the comparison of polarization ratio ($RC_{SVV}/RC_{SHH}$) for the human body alone and the human body holding a metal rod.

FIG. 9 illustrates the comparison of polarization ratio ($RC_{SVV}/RC_{SHH}$) for the human body alone and the human body holding a metal rod based on the work of Dogaru et al. In FIG. 9, polarization ratio estimates for the human body alone and for the human body holding a metal conductor based on the work of T. Dogaru et al. in "Computer models of the human body signature for sensing through the wall radar applications", Tech. Rpt. ARL-TR-4290, Army Research laboratory, 2007, were combined.

Figure 10:
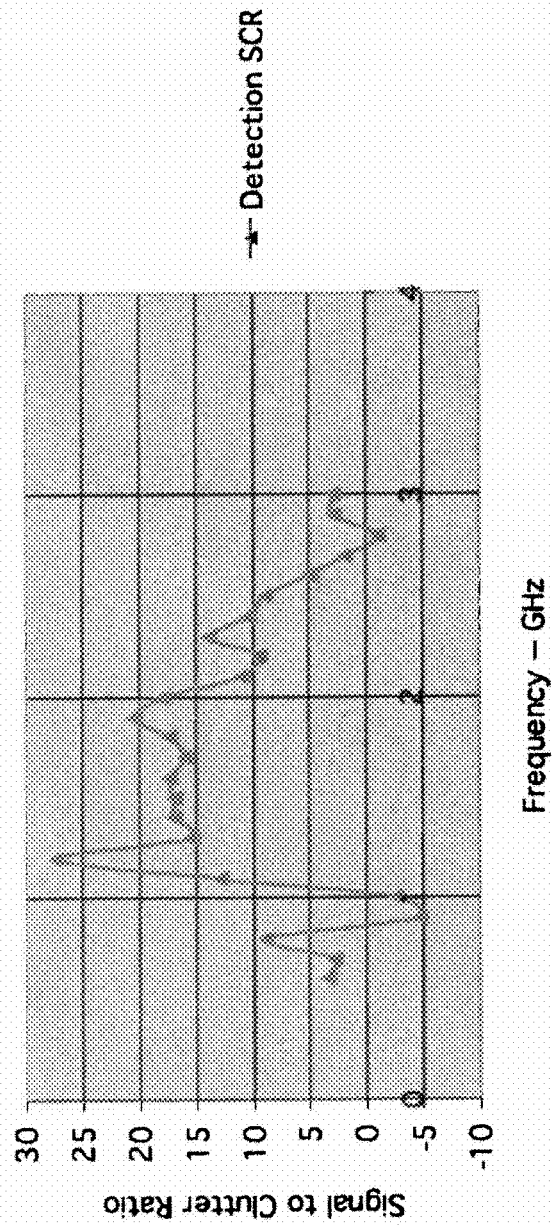
FIG. 10 illustrates a signal to clutter ratio (SCR) calculated from the polarization ratio data of FIG. 9.

FIG. 10 illustrates a signal to clutter ratio (SCR) calculated from the polarization ratio data of FIG. 9. In FIG. 10 the signal to clutter ratio (SCR) is plotted, i.e. the ratio between the polarization ratio for the human body holding a metal rod and polarization ratio for the human body alone. From FIGS. 9 and 10 it can be seen that the polarization ratio is a viable metric for detecting people with metallic conductors in a group of people without metallic conductors. Although the data of FIGS. 9 and 10 apply only to the frequency range near 1 to 3 GHz, the data in Table 2 cover the frequency range near 10 GHz. Thus, it can be concluded that the polarization ratio is a viable metric. The results regarding radar metrics are summarized in Table 6 below.

TABLE 6

Radar Metrics Summary

| Metric | Near 1 GHz | Near 10 GHz | Comments |
|---|---|---|---|
| RCS magnitude | Up to 10 dB in 200 MHz bands, variable | Not Useful | Body RCS too high at 10 GHz |

TABLE 6-continued

Radar Metrics Summary

| Metric | Near 1 GHz | Near 10 GHz | Comments |
|---|---|---|---|
| Polarization Ratio | Robust, ≈1 to 2.5 GHz | Useful, but variable | Best across the board |
| Doppler Features | Not Evaluated | Walking Speed & Fluctuations | Relatively unexplored |
| Comments | Good metrics, but poor location capability | Polarization metric, good location | All metrics need further experiments |

As described by S. Kingsley et al, in "Understanding radar systems", London: McGraw Hill, 1992, P. Swerling developed the exponential distributions shown in equation 5 to describe different types of radar cross sectional area fluctuations that can be used dependent upon the analysis of scatters.

$$p(\lambda) = \frac{1}{\lambda_{ave}} e^{\frac{-\lambda}{\lambda_{ave}}}, \lambda \geq 0 \quad (5)$$

$$p(\lambda) = \frac{4\lambda}{\lambda_{ave}^2} e^{\frac{-2\lambda}{\lambda_{ave}}}, \lambda \geq 0$$

As both detection and false-alarm probabilities are of interest, a threshold decision value, Y, is used such that the following events occur:

Target present: y(t)>Y→correct detection
Target present: y(t)<Y→missed detection
Target not present: y(t)>Y→false alarm
Target not present: y(t)<Y→no action In order to use Swirling's distribution, the collected empirical data is tested to ensure it followed an exponential distribution. A chi-squared goodness of fit test is used on the data to determine the distribution that governs the behavior of the data. Distinguishing patterns are sought that would lend themselves to discrimination for detection. Both theoretical avenues presented as well as empirical model building and analyses are examined.

In order to build an appropriate model to detect a suicide bomber wearing a wire for detonation in a crowd, several simplifying assumptions are made. Then, relationships among the variables may be determined. Initially, a stand-off range of 50 m from the radar to the subjects is assumed. Modeling the use of one radar provides valuable insight into the process of detecting suicide bombers. The suicide vests, explosives, and metal wires are as described earlier with reference to vest 1 (FIG. 2A) and vest 2 (FIG. 2B). Frequency analysis is restricted to the frequency band of the GunnPlexer radar. Variables will include frequency, time, radar cross section (RCS), vertical and horizontal polarization, and subjects with & without wires. It is assumed the speed (ft/sec) of the suicide bomber will be different (faster or slower) than the normal crowd. Further, it is assumed subjects wearing wires will be suspects, i.e., suicide bombers. It is further assumed no metal jewelry is worn nor will someone wear their cell phone around their neck.

First, the differences between V (vertical) and H (horizontal) polarization are computed for with wires and vest 1 (FIG. 2A) configuration and with wires and vest 2 (FIG. 2B) configurations. Table 7 shows descriptive statistics from Excel on a scaled data captured on the RCS of the differences between V (vertical) and H (horizontal) polarization. Column 1 represents with wires and vest 1 (FIG. 2A) configuration and column 2 represents with wires and vest 2 (FIG. 2B) configurations.

TABLE 7

Descriptive statistics from Excel on a scaled data captured on the RCS of the differences between V (vertical) and H (horizontal) polarization.

| Statistic | Vest 1 | Vest 2 |
|---|---|---|
| Mean | 6.5749 | 6.4058 |
| Standard Error | 0.9962 | 0.5485 |
| Median | 3.4825 | 5.782 |
| Mode | 2.4136 | 7.1107 |
| Standard Deviation | 6.37889 | 3.51212 |
| Sample Variance | 40.69 | 12.335 |
| Skewness | 1.385 | 0.3901 |
| Minimum | 0.1317 | 0.8848 |
| Maximum | 26.7975 | 14.4848 |
| Count | 41 | 41 |

Figure 11:
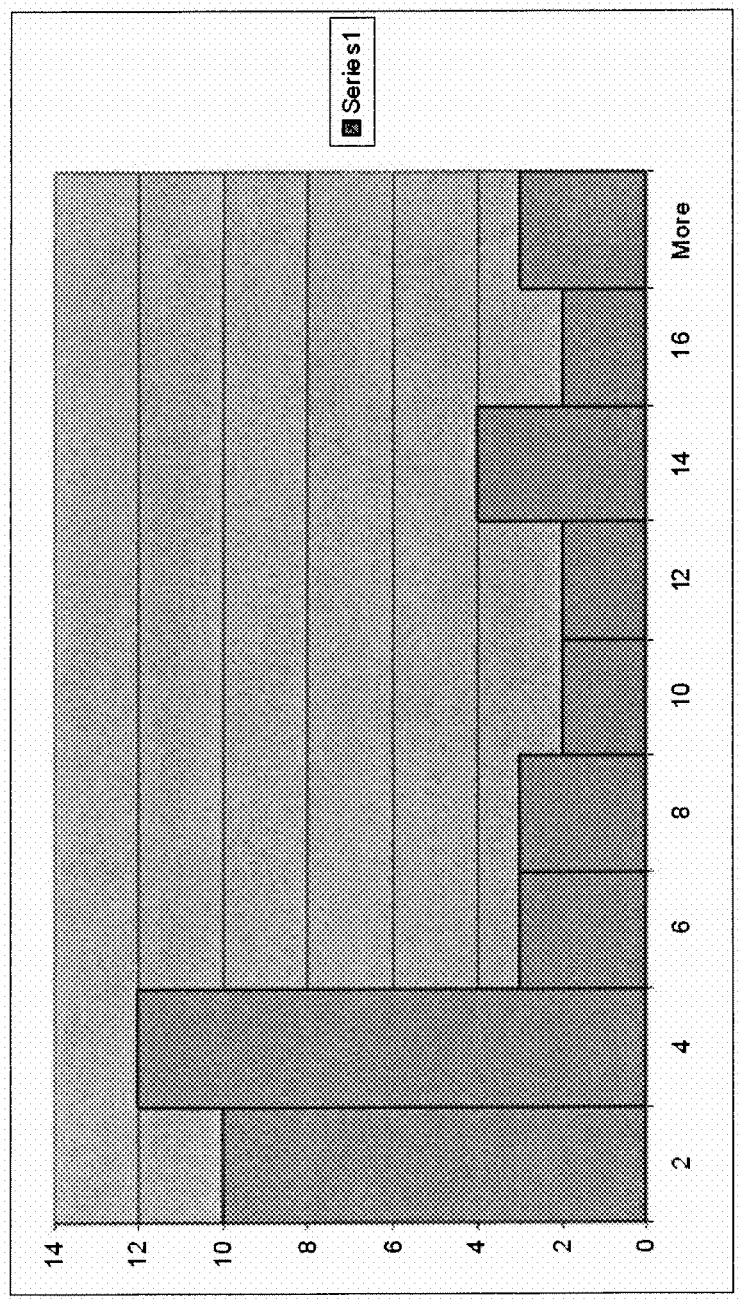
FIG. 11 illustrates a histogram of data set 1 for vest configuration 1 of FIG. 2A.

To illustrate that the RCS differences follow an exponential distribution, the scaled or normalized the data is taken and then a histogram of the data in vest 1 is determined as shown in FIG. 11. FIG. 11 illustrates a histogram of Data set 1 for vest configuration 1 of FIG. 2A. A chi-squared goodness of fit test to a truncated exponential distribution is performed using:

$$H_0: f(x) = \frac{\lambda e^{-\lambda x}}{1 - e^{-\lambda x_0}}, 0 \leq x \leq x_0$$

Figure 12:
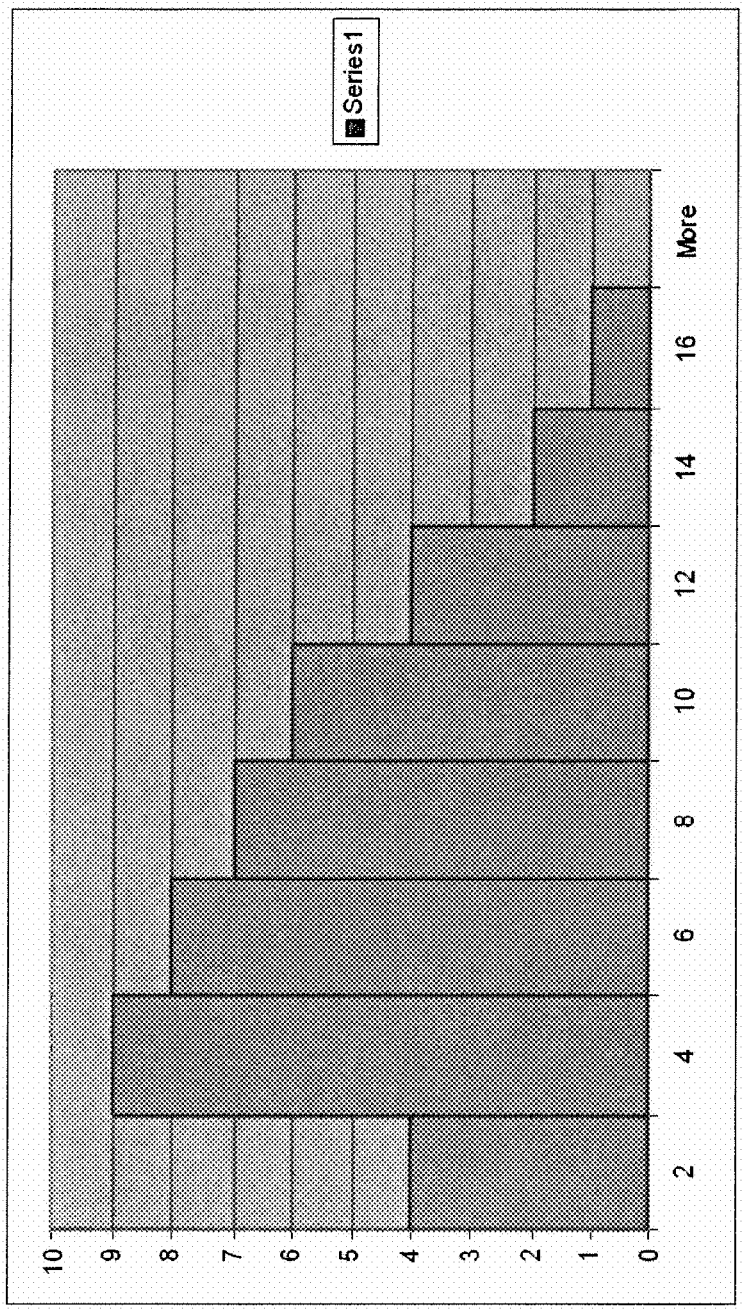
FIG. 12 illustrates a histogram of data set 2, vest configuration 2 of FIG. 2B.

Since the test statistic value is less than the critical value then, it is concluded that the truncated exponential with empirical mean 0.15209355 is a good fit at an α level of 0.05
$\chi^2 = 5.11619$
$\chi_{0.05,4}^2 = 9.48$ The same analysis is performed on the data from vest 2 (FIG. 2B) FIG. 12 illustrates a histogram of data set 2, vest configuration 2 A goodness of fit test to a truncated exponential distribution is performed using:

$$H_0: f(x) = \frac{\lambda e^{-\lambda x}}{1 - e^{-\lambda x_0}}, 0 \leq x \leq x_0$$

It can be concluded that the truncated exponential with empirical mean 0.156108622 is a good fit at an α level of 0.05.
$\chi^2 = 4.6898$
$\chi_{0.05,4}^2 = 9.48$ Thus, both empirical distributions are essentially exponential distributions. Examining the mean differences of 6.5749 and 6.405791 with respective standard deviations, 6.37889 and 3.51212, from the sample of size, n=41 and the central limit theorem can be evoked. This results in two normal random variables for the mean differences in the two cases: Normal (6.5749, 1.0004) and Normal (6.37889, 0.5485) that can be utilized in the simulation model further described herein. By capturing the RCS differences, the probabilities can be computed, confidence intervals can be computed, or hypothesis tests on the data computed to measure the statistical evidence of wires on a person, as false positive are a concern, as the radars will detect not only wires and metal canister bombs on persons but also cell phones hung around the neck and jewelry worn on the body.

Descriptive statistics on the human body without wires is obtained in testing and is shown in Table 8.

TABLE 8

Descriptive Statistics on persons without wires
Human without wires

| | |
|---|---|
| Mean | 0.965609756 |
| Standard Error | 0.107658023 |
| Median | 1.19 |
| Mode | 1.45 |
| Standard Deviation | 0.689347694 |
| Sample Variance | 0.475200244 |
| Kurtosis | −1.795330031 |
| Skewness | −0.148915314 |
| Range | 1.8 |
| Minimum | 0 |
| Maximum | 1.8 |
| Sum | 39.59 |
| Count | 41 |

A chi-squared goodness of fit test for this data and exponential distribution with mean of 0.965609756 is performed using the same technique earlier described. Since 1.249163<9.48, it cannot be rejected that the distribution is exponential with mean 0.965609756 and thus it can be concluded that the data is a good fit.

Using a simple hypothesis test.
$H_0: \mu = 1$
$H_a: \mu \neq 1$
and a 0.05 level of significance, a critical value of $z_{a/2} = 1.95$ is obtained. The test statistic is 0.3195. As −0.3195<1.96, then the null hypothesis cannot be rejected. Thus this confirms a mean RCS of a human is 1 m².

Figure 13:
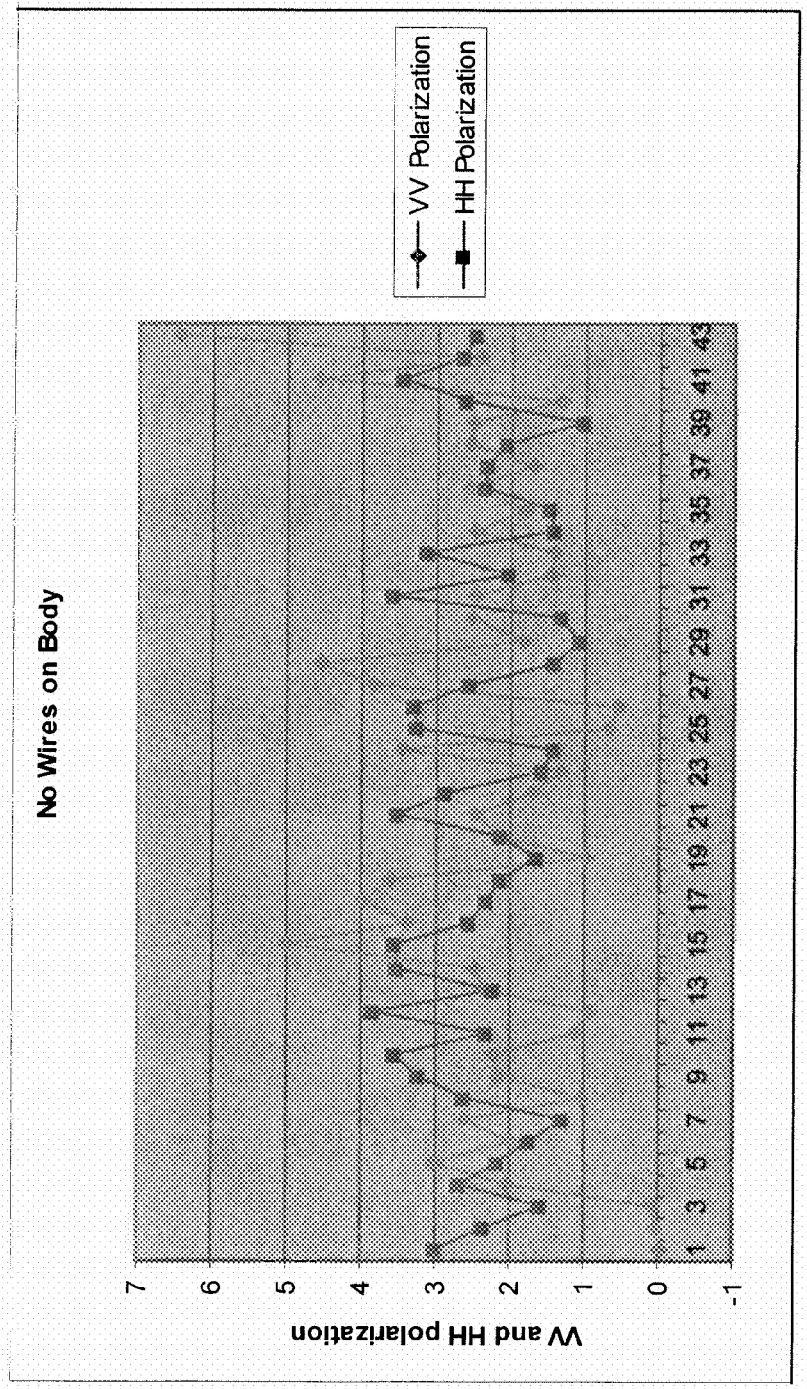
FIG. 13 illustrates a plot of persons (RCS differences) without wires.

FIG. 13 illustrates a plot of persons (RCS differences) without wires. As illustrated in FIG. 13, there are similarities in the two curves for the VV and HH polarization similar to the work of Dogaru earlier discussed with reference to FIG. 9. Also there are not large differences in the two polarizations.

Figure 14:
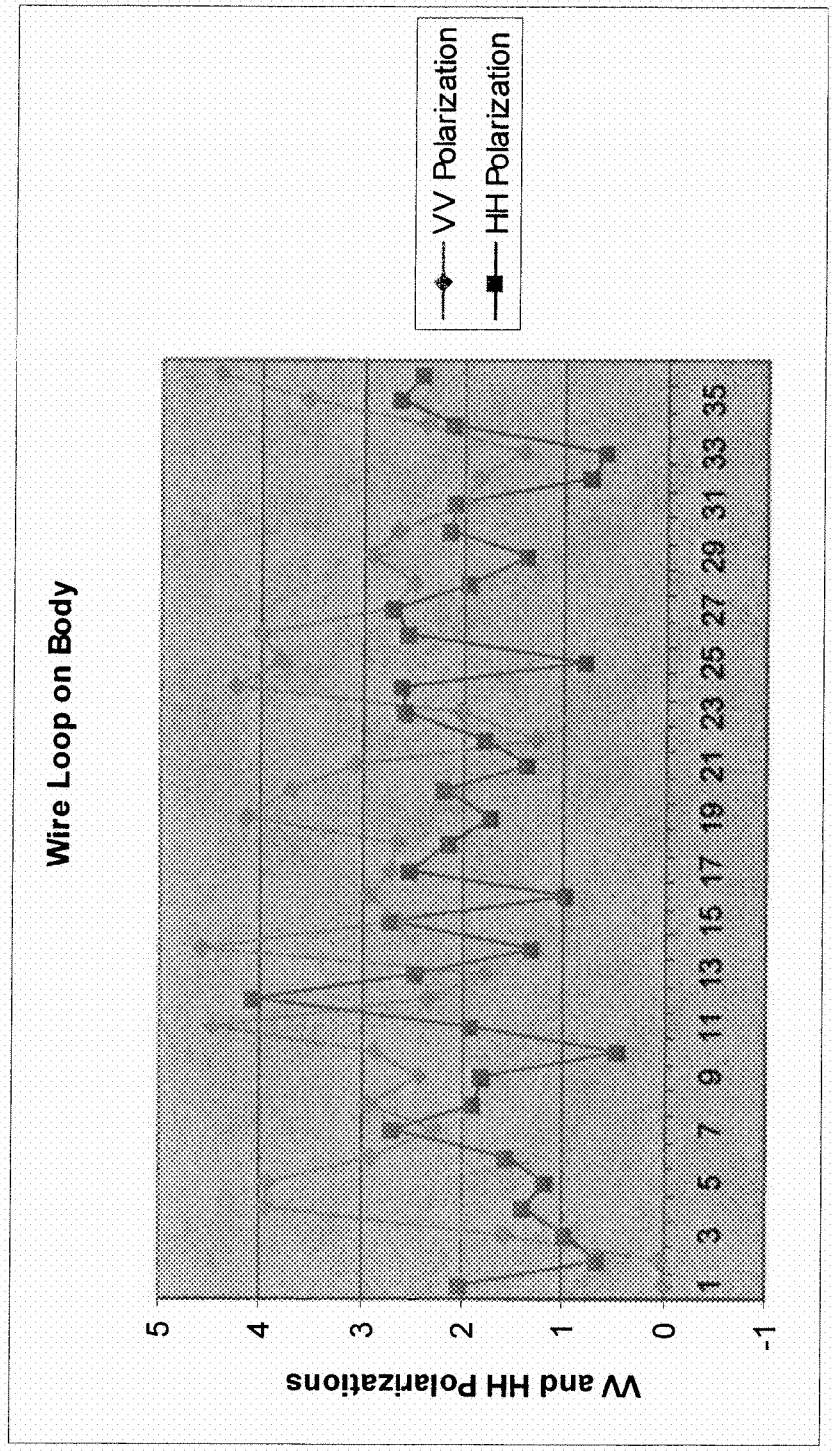
FIG. 14 illustrates plots of RCS differences for persons with wires in the vest 1 configuration of FIG. 2A.
Figure 15:
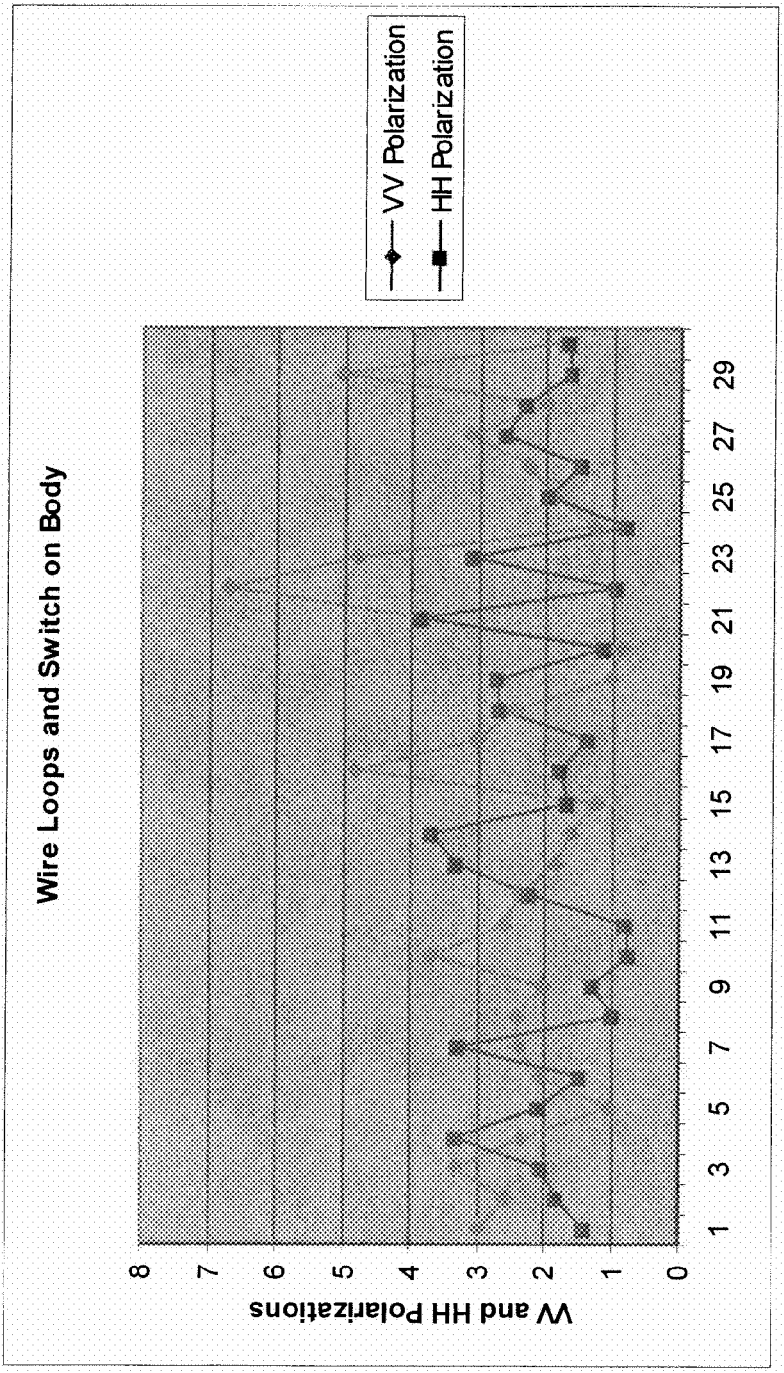
FIG. 15 illustrates plots of RCS differences for persons with wires and a switch in the vest 2 configuration of FIG. 2B.

FIG. 14 illustrates plots of RCS differences for persons with wires in the vest 1 configuration of FIG. 2A. FIG. 15 illustrates plots of RCS differences for persons with wires and a switch in the vest 2 configuration of FIG. 2B. In referring to FIG. 14 and FIG. 15, a wider gap is observed between the polarizations indicating a possible metric, the absolute difference in polarization or the ratio of polarizations. These plots show that there is a visual difference between the RCS with VV and HH polarization when wires are on the subjects. Therefore, it can be concluded that a possible metric for identifying wires on a person can be accomplished through the absolute difference between the VV and HH RCS measurements.

Figure 16:
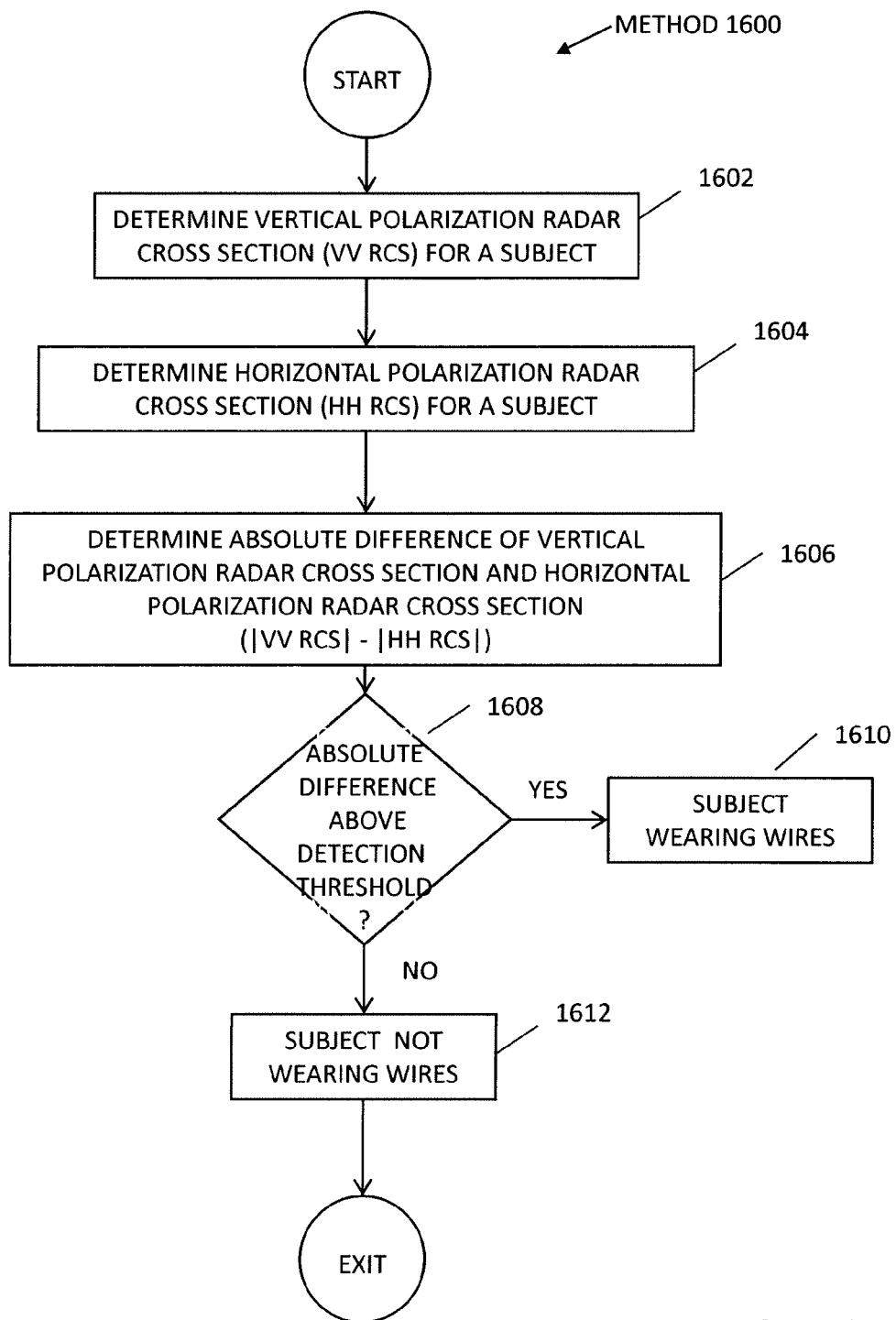
FIG. 16 illustrates a method for detecting persons wearing wires based on the absolute difference of the vertical polarization radar cross section and the horizontal polarization radar cross section in accordance with one embodiment.

FIG. 16 illustrates a method 1600 for detecting persons wearing wires based on the absolute difference of the vertical polarization radar cross section and the horizontal polarization radar cross section in accordance with one embodiment. As illustrated in FIG. 16, in operation 1602, the vertical polarization radar cross section (VV RCS) for a subject, such as a person is determined. In operation 1604 the horizontal polarization radar cross section (HH RCS) for the subject is determined. In one embodiment, the VV RCS and the HH RCS can be obtained by exposing a moving subject to one or more output radar signals and collecting return radar spectra at one or more antennae, where the radar spectra include at least information for determining the VV RCS and the HH RCS for the subject (for example, see FIG. 8).

In operation 1606, the absolute difference of the vertical polarization radar cross section and the horizontal polarization radar cross section (|VV RCS|−|HH RCS|) is determined. In operation 1608 the absolute difference is compared to a specified detection threshold. In operation 1610 based on the comparison in operation 1608 when the absolute difference is above said detection threshold, the subject is determined to be wearing wires. Alternatively, in operation 1612, when the absolute difference is below the detection threshold, the subject is not determined to be wearing wires. As can be appreciated by those of skill in the art, in other embodiments, operation 1604 could be performed before operation 1602, and the comparison in operation 1608 with results 1610 and 1612 could be performed in different ways to obtain the determinations.

In one embodiment, the polarization ratio, VV/HH is also examined as a metric for identifying persons with wires. The results from the 10.25 GHz GunnPlexer measurements described above are summarized in the Table 9 below.

TABLE 9

Measurements from GunnPlexer Radar

| Experiment | Description | RCS VV | RCS HH | Ratio | SE |
|---|---|---|---|---|---|
| #2 & #3 | No Metal | 2.44 | 2.37 | 1.03 | 0.12 |
| #4 & #5 | Loop around waist | 2.78 | 1.80 | 1.52 | 0.15 |
| #7 & #8 | Loop around waist & wire down sleeve | 2.87 | 2.00 | 1.43 | 0.11 |

The polarization ratio for the cases where the subject has wires on his person is shown to be significantly different from the case without wires, given the level of uncertainty in the measurements. It appears as though the larger the polarization ratio the more likely it is that a subject is wearing wires. Also the polarization ratio for a person without wires is almost 1 m². This is consistent with the human body having an RCS of 1 m² regardless of polarity as seen in FIG. 13.

The higher ratio or lower ratios (depending upon HH/VV or VV/HH) are shown to be significant indicators of wires on humans as seen in FIGS. 14 and 15. Hypothesis tests are performed as follows for the three cases to ensure that statistical significance in differences of the means can be measured:
Case 1:
$H_0: \mu_1 = \mu_2$
$H_a: \mu_1 \neq u_2$
Case 2:
$H_0: \mu_1 = \mu_3$
$H_a: \mu_1 \neq u_3$
Case 3:
$H_0: \mu_2 = \mu_3$
$H_a: \mu_2 \neq u_3$
Rejection region with α=0.05 in each case is reject if |Z|>1.96.
The test statistics are
Case 1: |Z|=|1.03−1.520/(0.1425)|=3.439
Case 2: |Z|=|1.03−1.430/(0.1628)|=2.457
Case 3: |Z|=|1.52−1.43/(0.186)|=0.483

Decisions:
Reject the null hypothesis in Case 1 and Case 2 concluding the ratios are different. The null hypothesis in Case 3 fails to be rejected, thus it can be concluded that the ratios for the wires on humans are statistically the same.

Another quick method to get information quickly is via confidence intervals. A 95% confidence intervals for the mean ratios in this case is provided:

$$\overline{X} \pm z_{\frac{\alpha}{2}} \frac{s}{\sqrt{n}}$$

As large sample and means are being utilized, it can be assumed that the central limit theorem holds and the normal distribution utilized. A $\alpha$ is 0.05 is assumed for this analysis. The results of building a confidence interval for the three ratios is shown as:
No metal: The 95% CI is between [0.7948, 1.2652].
Wire loops: The 95% CI is between [1.226, 1.814].
Wire loop and wire down sleeve: The 95% CI is between 1.2144, 1.6456].
There is overlap of the 95% CI of all three different experiments. The overlap illustrates a region where there is the potential for identifying "false positives". This region from about 1.2144 to 1.2652. This single metric could be used with additional metric for clarification.

Figure 17:
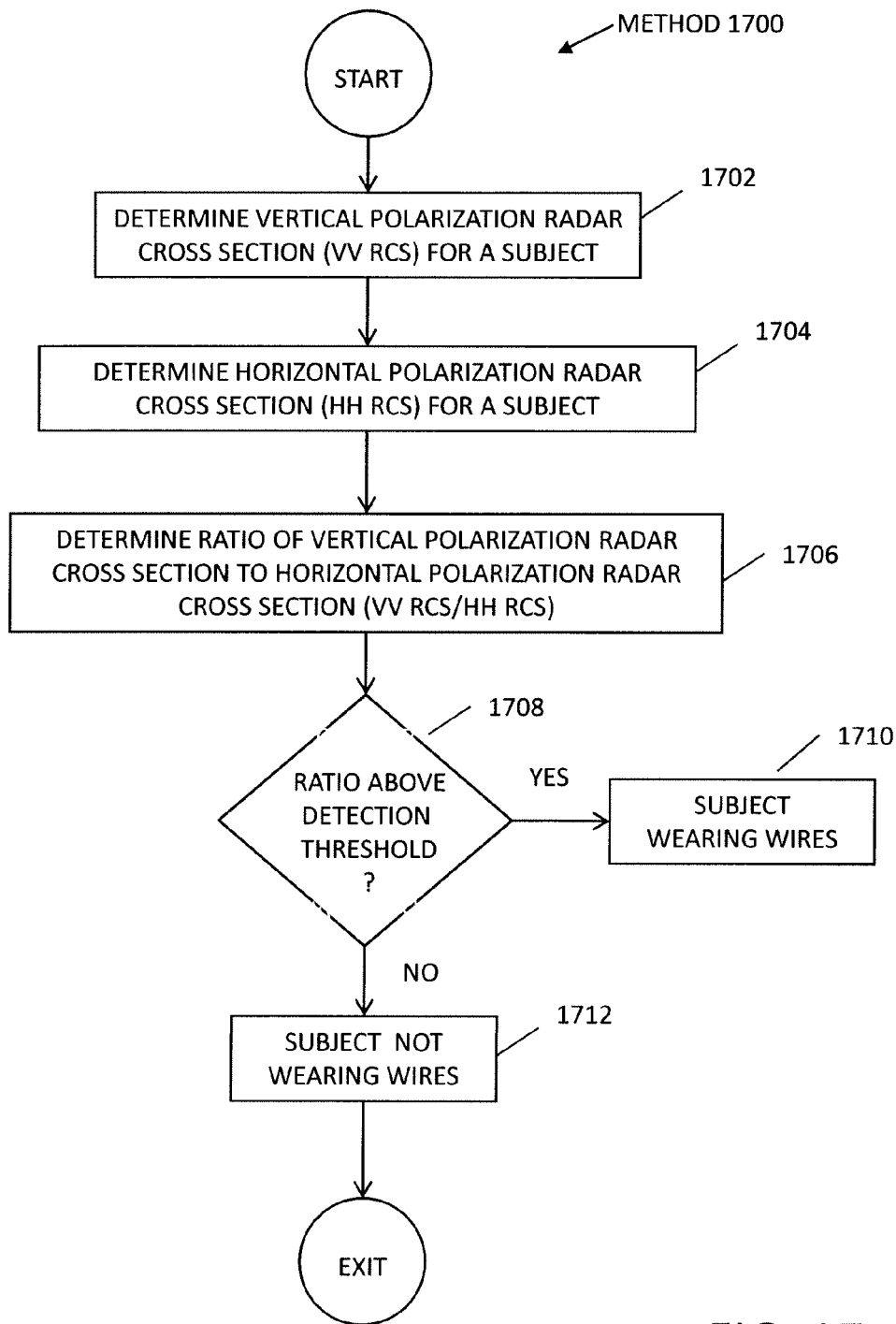
FIG. 17 illustrates a method for detecting persons wearing wires based on the ratio of the vertical polarization radar cross section to the horizontal polarization radar cross section in accordance with another embodiment.

FIG. 17 illustrates a method 1700 for detecting persons wearing wires based on the ratio of the vertical polarization radar cross section to the horizontal polarization radar cross section in accordance with another embodiment. As illustrated in FIG. 17, in operation 1702, the vertical polarization radar cross section (VV RCS) for a subject, such as a person is determined. In operation 1704 the horizontal polarization radar cross section (HH RCS) for the subject is determined. In one embodiment, the VV RCS and the HH RCS can be obtained by exposing a moving subject to one or more output radar signals and collecting return radar spectra at one or more antennae, where the radar spectra include at least information for determining the VV RCS and the HH RCS for the subject (for example, see FIG. 8).

In operation 1706, the ratio of the vertical polarization radar cross section to the horizontal polarization radar cross section (VV RCS/HH RCS) is determined. In operation 1708 the ratio is compared to a specified detection threshold. In operation 1710 based on the comparison in operation 1608 when the ratio is above said detection threshold, the subject is determined to be wearing wires. Alternatively, in operation 1712, when the ratio is below the detection threshold, the subject is not determined to be wearing wires. As can be appreciated by those of skill in the art, in other embodiments, operation 1704 could be performed before operation 1702, and the comparison in operation 1708 with results 1710 and 1712 could be performed in different ways to obtain the determinations. Also in an alternative embodiment, the ratio used could instead be HH RCS/VV RCS and the detection threshold set up accordingly.

In previous analysis done by M. H. Bornstein and H. G. Bornstein in "The Pace of Life", Nature 1976: 259: 557-559, the average speed a person walks in various cities of the world as a function of the size of the population was calculated. There were four Middle Eastern cities in their analysis with average walking speeds of 3.70, 3.27, 4.31, and 4.42 feet/sec. It is assumed a that suicide bomber will not walk at the same speed as everyone else and that there speed can be a further metric to remove the false positives. The Doppler radar can provide information about the speed of the subject under investigation because of suspected wires. This speed of the subject if either to slow or to fast as differentiated from the norm in the region can be used to help support the finding of a target.

For example, the average speed of a Middle Eastern person is normally distributed with mean 3.925 and standard deviation 0.5394. Performing a hypothesis test using a level of significance of 0.05 (0.025 in each tail)
$H_0: \mu = 3.925$
$H_a: \mu \neq 3.925$
The average speed of the subject is found by the radar to be 4.5 f/s from 36 reads.
Test statistic is z=6.39.
The rejection region is to reject the null hypothesis when $Z \geq |Z_{\alpha/2}|$.
Reject if $Z \geq |1.96|$. It is found that $6.39 \geq |1.96|$ so the null hypothesis is rejected and it is concluded that the speed of the subject is not consistent with normal speed in the region. The individual's speed (if the assumption holds) gives another metric in detection analysis.

Thus, various metrics have been used in the above analysis: RCS differences, RCS ratios, and speed. A Monte Carlo simulation model of simple, single radar scanning a crowd with a suicide bomber in the crowd is examined. The simulation algorithm employed was converted into a simple simulation within Excel.

Figure 18A:
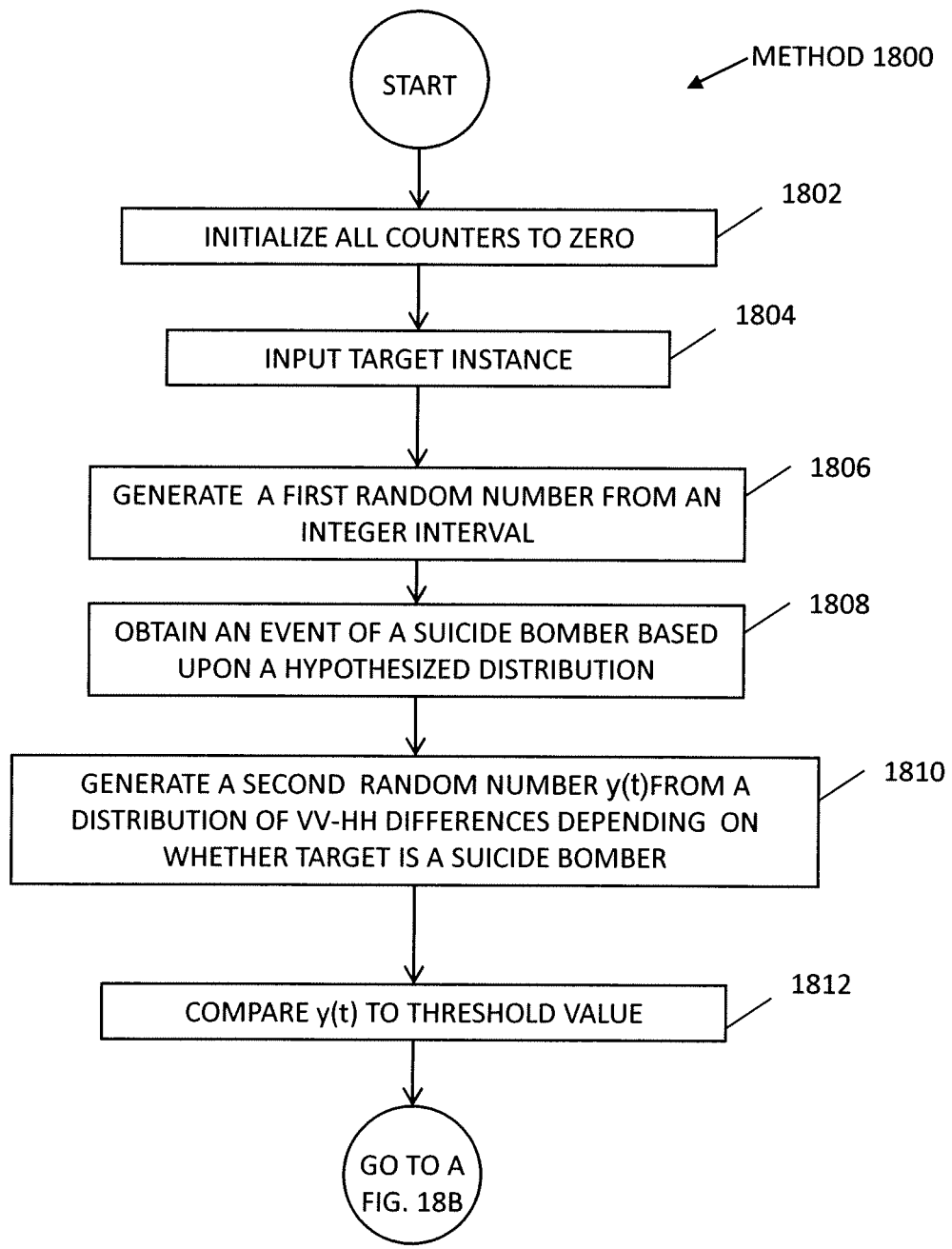
FIGS. 18A and 18B illustrate a method for simulating the detection of persons with wires using radar in accordance with one embodiment.
Figure 18B:
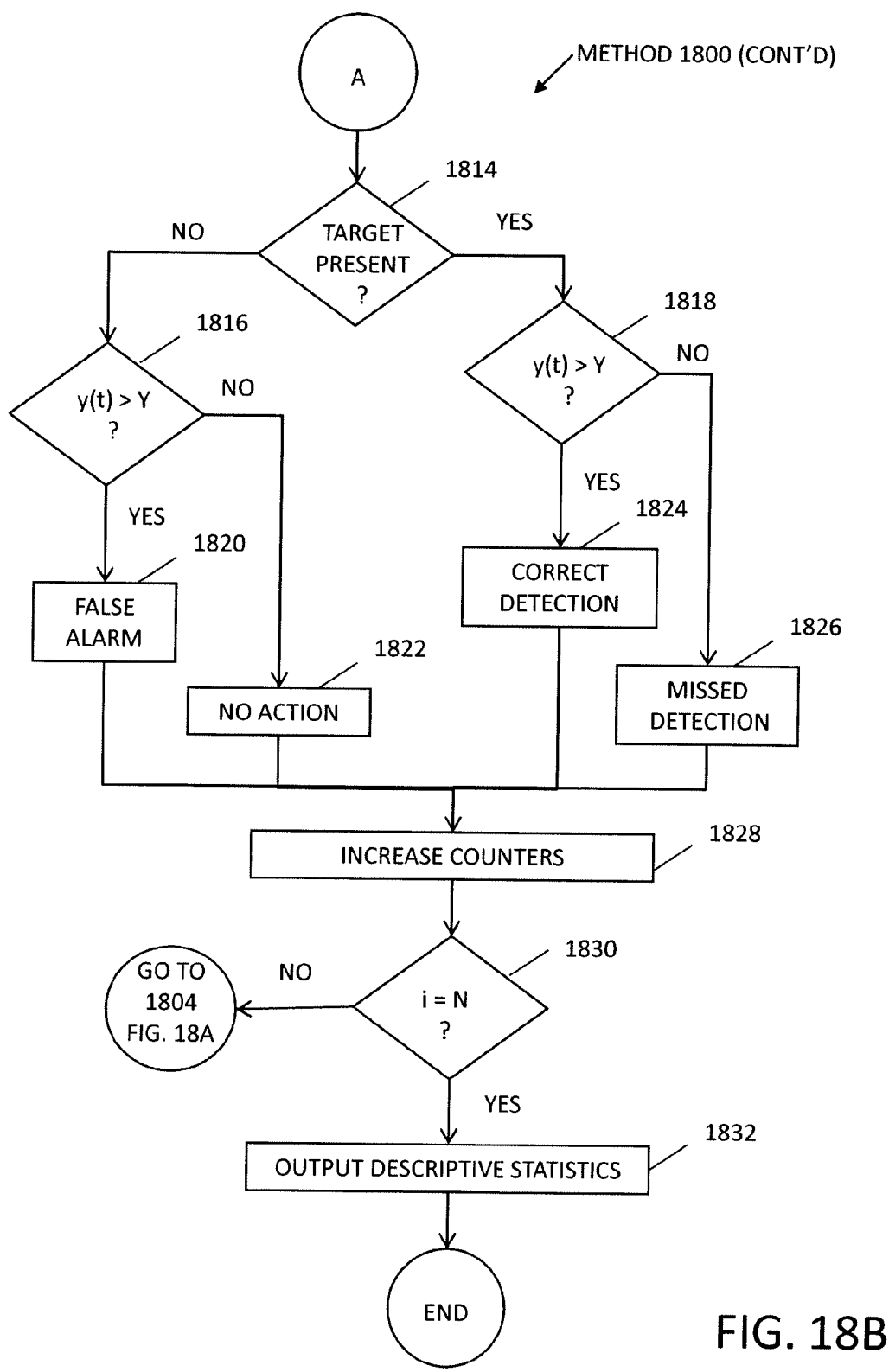

FIGS. 18A and 18B illustrate a method 1800 for simulating the detection of persons with wires using radar in accordance with one embodiment. In method 1800, INPUTS are N, number of runs, assumed distribution for the number of suicide bombers in a crowd, distributions for probability metric for radar detections, and threshold value. OUTPUTS are the number of positive detections and the number of false detections.

As illustrated in FIG. 18A, method 1800 is entered and at operation 1802 in which all counters are initialized, for example: detections=0, false alarms=0, suicide bombers=0. In operation 1804 an initial target instance is input, where i=1, 2 . . . , N trials. In operation 1806 a first random number is generated from an integer interval [a,b]. in operation 1808 an event of a suicide bomber based upon an hypothesized distribution of the number of suicide bombers in a crowd of size X is obtained. In one embodiment, if random number≤a, then a suicide bomber is detected, otherwise not. In operation 1810 a second random number is generated from the distribution of VV-HH differences depending on whether the target is a suicide bomber with a vest and wires or not a suicide bomber. These distributions are described previously. In operation 1812 the second random number is compared to the detection threshold value as further described with reference to FIG. 18B.

Referring now to FIG. 18B and method 1800. In operation 1814, a determination is made if the target is present. If the target is not present ("NO"), processing proceeds to operation 1816; otherwise, if the target is present ("YES"), processing proceeds to operation 1818. Referring now to operation 1816, in operation 1816 a determination is made whether y(t) is greater than Y. If y(t) is greater than Y("YES"), processing proceeds to operation 1820 and a determination of a false alarm is made. Alternatively in operation 1816, if y(t) is not greater that Y ("NO"), processing proceeds to operation 1822 and a determination of no action is made.

Referring now back to operation 1814, when the target is present ("YES"), processing proceeds to operation 1818. In operation 1818, a determination is made whether y(t) is greater than Y. If y(t) is greater than Y("YES"), processing proceeds to operation 1824 and a determination of a correct detection is made. Alternatively in operation 1818, if y(t) is not greater than Y ("NO"), processing proceeds to operation 1826 and a determination of a missed detection is made.

From operations 1820, 1822, 1824, and 1826, processing proceeds to operation 1828 in which counters are incremented as needed. From operation 1828 processing proceeds to operation 1830 and a determination is made whether i=N, i.e., whether there are further instances to be processed. If there are further instances i to be processed ("NO"), processing returns to operation 1804 and the next instance is processed as earlier described with reference to the first instance. Alternatively, in operation 1830, if I=N ("YES"), there are no further instances i to be processed and processing proceeds to operation 1832 with the descriptive statistics accumulated by the counters output. From operation 1832, method 1800 is exited.

In one embodiment, the purpose of the Monte Carlo simulation models is two-fold. First, to enable a large plurality of experimental runs and to capture statistics on identifying positive and false targets. Second, the simulation allows test various simplified scenarios to be tested without putting individuals in harm's way.

In one embodiment, the threshold of differences was chosen experimentally as 5.08. Numerous trials were run and captured values for the number of suicide bombers, the number of found targets, the number of bombers missed by the simulation detection techniques, and the number of false positives. The simulation runs of 1,000 trials thirty six times each was repeated.

TABLE 10

Simulations Results from VV-HH Differences for 36 runs of 1,000 trials each

| Suicide Bombers | | Not suicide bombers | |
|---|---|---|---|
| Mean | 0.560787438 | Mean | 0.543975052 |
| Standard Error | 0.034917055 | Standard Error | 0.019330647 |
| Median | 0.585714286 | Median | 0.559027778 |
| Mode | 0.5 | Mode | 0.5 |
| Standard Deviation | 0.20950233 | Standard Deviation | 0.115983885 |
| Sample Variance | 0.043891226 | Sample Variance | 0.013452262 |
| Kurtosis | −0.034954882 | Kurtosis | 0.757669734 |
| Skewness | 0.265457119 | Skewness | −0.768842667 |
| Range | 0.833333333 | Range | 0.516908213 |
| Minimum | 0.166666667 | Minimum | 0.222222222 |
| Maximum | 1 | Maximum | 0.739130435 |
| Sum | 20.18834776 | Sum | 19.58310187 |
| Count | 36 | Count | 36 |

Referring to Table 10, 100% of the suicide bombers are found only 8.33% of the time using just the absolute differences in polarization. On average 56% of the suicide bombers created in the simulation are found. On average, false targets are found 54.39% of the time. These 54.39% should utilize additional metrics to exclude these possible subjects. These results are slightly better than random checks (50-50) by guessing.

The simulation is repeated, replacing the metric of differences with the metric using polarization ratio data. Simulation 2 uses the ratios in RCS to generate the detection of the suicide bombers and capture statistics. Operation 1610 of the method is accordingly changed to use the polarization ratios and their respective distributions.

The threshold of differences is chosen experimentally as 1.35. 1,000 trials are run and captured values for number of suicide bombers, number of found targets number of bombers missed by the simulation detection techniques, and number of false positives. The simulation runs are repeated to obtain 36,000 trials. Again, EXCEL is used to perform the simulation algorithm.

TABLE 11

Simulations Results from VV/HH Ratio for 36 runs of 1,000 trials each

| Suicide Bombers | | False Positives | |
|---|---|---|---|
| Mean | 0.834174 | Mean | 0.28081 |
| Standard Error | 0.020971 | Standard Error | 0.030595 |
| Median | 0.845238 | Median | 0.307692 |
| Mode | 1 | Mode | 0 |
| Standard Deviation | 0.125823 | Standard Deviation | 0.183571 |
| Sample Variance | 0.015831 | Sample Variance | 0.033698 |
| Kurtosis | −1.12174 | Kurtosis | −1.05429 |
| Skewness | −0.19122 | Skewness | −0.19534 |
| Range | 0.4 | Range | 0.6 |
| Minimum | 0.6 | Minimum | 0 |
| Maximum | 1 | Maximum | 0.6 |
| Sum | 30.03027 | Sum | 10.10915 |
| Count | 36 | Count | 36 |

As illustrated in Table 11, 100% of the suicide bombers are found 22.22% (an increase of 14% over the differences) of the time using just polarization ratios. On average 83.42% of the suicide bombers created in the simulation are found. On average, false targets are found 28.08% of the time.

In the above simulation, use of the polarization ratio of RCS VV to HH results in better detection of persons wearing wires. On average 30% more suicide bombers are detected and a decrease of 30% in false detections are observed. Again, the initial simulation model does not include the speed of the target as a metric. Including this metric should improve the statistics of detecting the target as well as further decreasing the false positives even further.

Simulation 2 is repeated adding in the assumption about walking speed being normally distributed (3.925, 0.54) for a normal person and significantly less for a suicide bomber. 100% of the suicide bombers are detected. The speed metric yields an increase in false positives due to speed only but that number is significantly reduced with the RCS polarization ratio metric. However, when coupled with the other metrics for detection and false positives, it does not significantly affect those probabilities in the simulation cases (using the polarization ratios).

Embodiments in accordance with the invention provide a method for detecting targets carrying wires on their bodies using radar cross-section characteristics. In further embodiments, the introduction of range and direction measurements can allow further isolation of suspects in terms of their location relative to the radar. For example, a more advanced (pulse Doppler or FMCW) radar could make effective measurements of both range and target speed. By combining radar with either video observations or thermal imaging, the identification of a suspect can be narrowed to a small number of individuals, identified visually in a group. Target speed, determined by the Doppler shift of the radar echo, allows both metrics for identifying suspects, e.g. walking speed, as well as tracking the suspect in a group using video images. Fluctuations in speed (Doppler shift) and radar cross section as a subject walks can provide further metrics for identifying suspects with wires.

Accordingly, this disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method for radar detection of subjects wearing wires comprising:
    determining a vertical polarization radar cross section for a subject;
    determining a horizontal polarization radar cross section for said subject;
    determining a ratio of said vertical polarization radar cross section to said horizontal polarization radar cross section by dividing said vertical polarization radar cross section by said horizontal polarization radar cross section;
    comparing said ratio to a specified detection threshold;
    when said ratio is above said detection threshold, determining said subject is wearing wires; and
    when said ratio is below said detection threshold, determining said subject is not wearing wires.

2. The method of claim 1 further comprising:
    exposing said subject while moving to one or more output radar signals; and
    collecting return radar spectra at one or more antennae, wherein said radar spectra include at least information for determining said vertical polarization radar cross section for said subject and said horizontal polarization radar cross section for said subject.

3. A method for radar detection of subjects wearing wires comprising:
    determining a vertical polarization radar cross section for a subject;
    determining a horizontal polarization radar cross section for said subject;
    determining the absolute difference of said vertical polarization radar cross section and said horizontal polarization radar cross section by subtracting an absolute value of said horizontal polarization radar cross section from an absolute value of said vertical polarization radar cross section;
    comparing said absolute difference to a specified detection threshold;
    when said absolute difference is above said detection threshold, determining said subject is wearing wires; and
    when said absolute difference is below said detection threshold, determining said subject is not wearing wires.

4. The method of claim 3 further comprising:
    exposing said subject while moving to one or more output radar signals; and
    collecting return radar spectra at one or more antennae, wherein said radar spectra include at least information for determining said vertical polarization radar cross section for said subject and said horizontal polarization radar cross section for said subject.

* * * * *